United States Patent [19]

Terada et al.

[11] Patent Number: 5,931,946
[45] Date of Patent: Aug. 3, 1999

[54] NETWORK SYSTEM HAVING EXTERNAL/INTERNAL AUDIT SYSTEM FOR COMPUTER SECURITY

[75] Inventors: Masato Terada, Sagamihara; Kenichi Yoshida, Kitamoto; Makoto Kayashima, Yamato, all of Japan

[73] Assignee: Hitachi, Ltd., Tokyo, Japan

[21] Appl. No.: 08/796,567

[22] Filed: Feb. 6, 1997

[30] Foreign Application Priority Data

Feb. 8, 1996 [JP] Japan .................................... 8-022781

[51] Int. Cl.[6] .................................................. G06F 13/00
[52] U.S. Cl. .......................................................... 713/201
[58] Field of Search .............................. 395/187.01, 186, 395/180, 200.11, 200.54; 364/184, 222.5, 264, 267.4, 550, 286.4; 713/200, 201; 714/1; 709/224

[56] References Cited

U.S. PATENT DOCUMENTS

| | | | |
|---|---|---|---|
| 5,032,979 | 7/1991 | Hecht et al. | 364/200 |
| 5,475,839 | 12/1995 | Watson et al. | 395/650 |
| 5,485,409 | 1/1996 | Gupta et al. | 395/186 |
| 5,684,957 | 11/1997 | Kondo et al. | 395/200.06 |

OTHER PUBLICATIONS

Winkler, "A Unix Prototype for Intrusion and Anomaly Detection in Secure Networks", Proceedings of 13th National Computer Security Conference, pp. 1–10, Oct. 1990.

Mukherjee et al., "Network Intrusion Detection", IEEE, pp. 26–41, Jun. 1994.

Winkler et al., Intrusion and Anomaly Detection in Trusted Systems, IEEE, pp. 39–45, Dec. 1989.

Nemeth et al., UNIX System Administration Handbook, 2nd Ed., Prentice Hall PTR, pp. 539–560, Dec. 1995.

Russell et al., Computer Security Basics, O'Reilly & Associates, Inc., pp. 11–13, Dec. 1991.

Bartee, Data Communications, Networks, and Systems, pp. 313–315, Dec. 1991.

Farmer et al., "The COPS Security Checker System" Purdue University Technical Report CSD–TR–993, Sep. 1991.

Farmer et al., "SATAN—Adminstrator Tool for Analyzing Networks", HTML documentation files, http://www.cerf.net/security/satan/docs/, Dec. 1995.

*Primary Examiner*—Robert W. Beausoliel, Jr.
*Assistant Examiner*—Stephen C. Elmore
*Attorney, Agent, or Firm*—Antonelli, Terry, Stout & Kraus, LLP

[57] ABSTRACT

A network system includes: a plurality of repeating installations connected to the network; a plurality of computers connected to the network, each of the computers being connected to the network through a corresponding repeating installation; and a management unit connected to the network. The management unit includes distribution means for distributing at least one of an external audit program and an internal audit program for defining the processing procedure, by which the repeating installation audits vulnerability of at least one of the plurality of computers, from the management unit to the repeating installations through the network. The repeating installation includes audit control means for carrying out at least one of the external audit processing and the internal audit processing with respect to the vulnerability of the at least one computer in accordance with at least one of the external audit program and the internal audit program which have been distributed from the management unit to judge whether or not the at least one computer has the vulnerability.

22 Claims, 20 Drawing Sheets

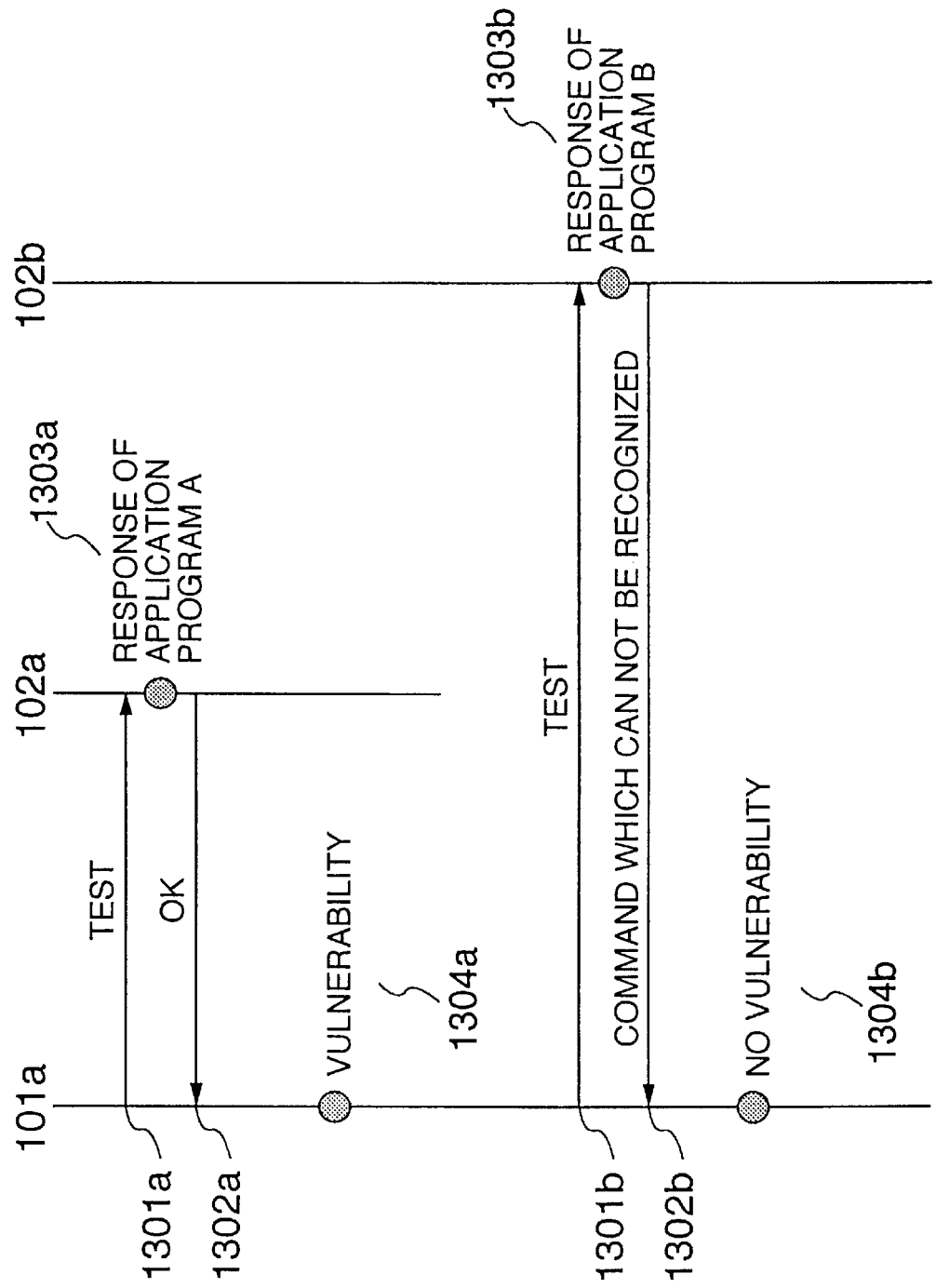

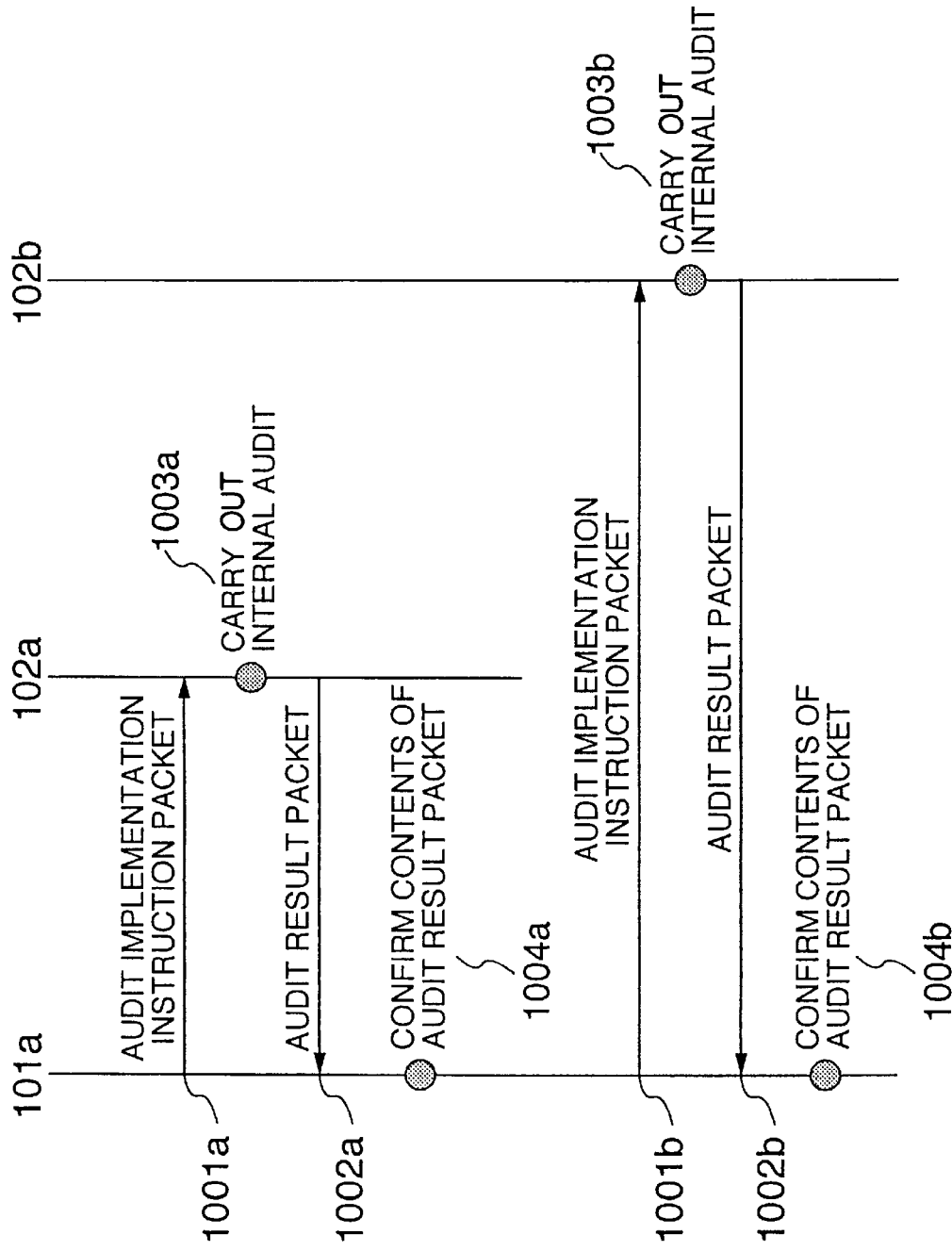

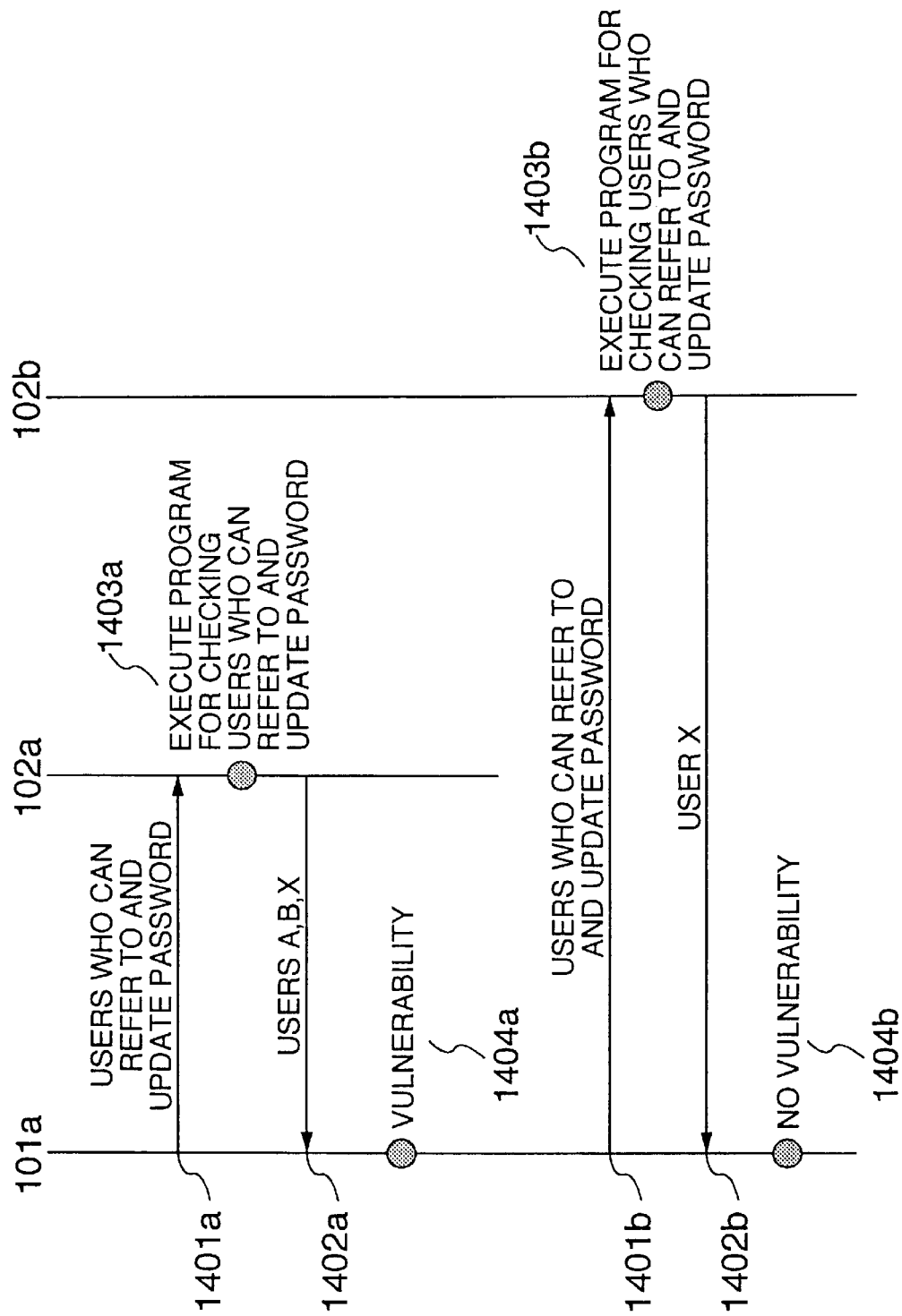

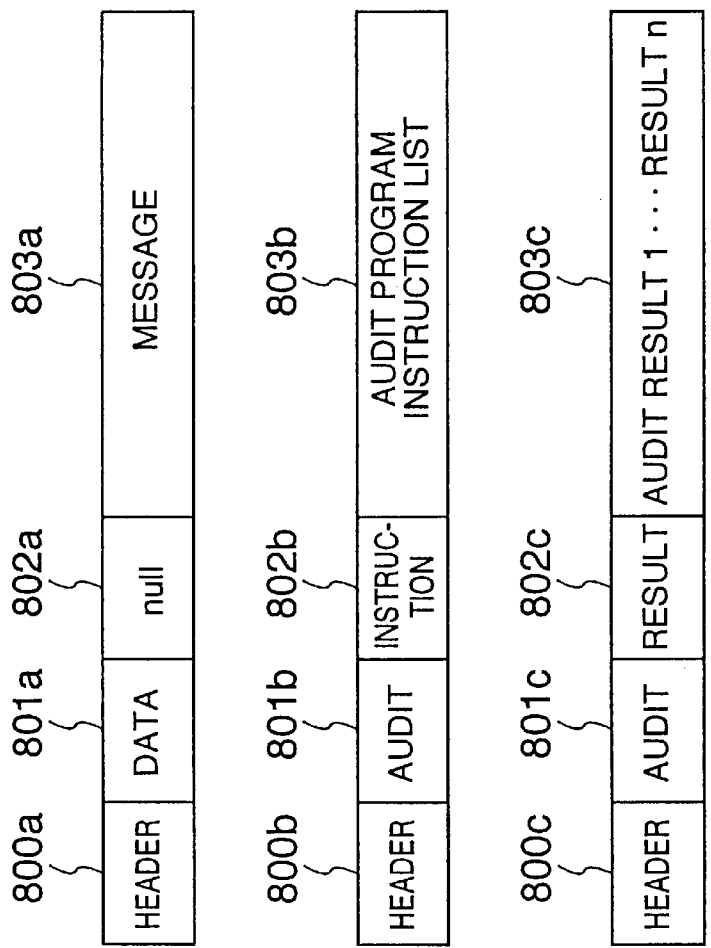

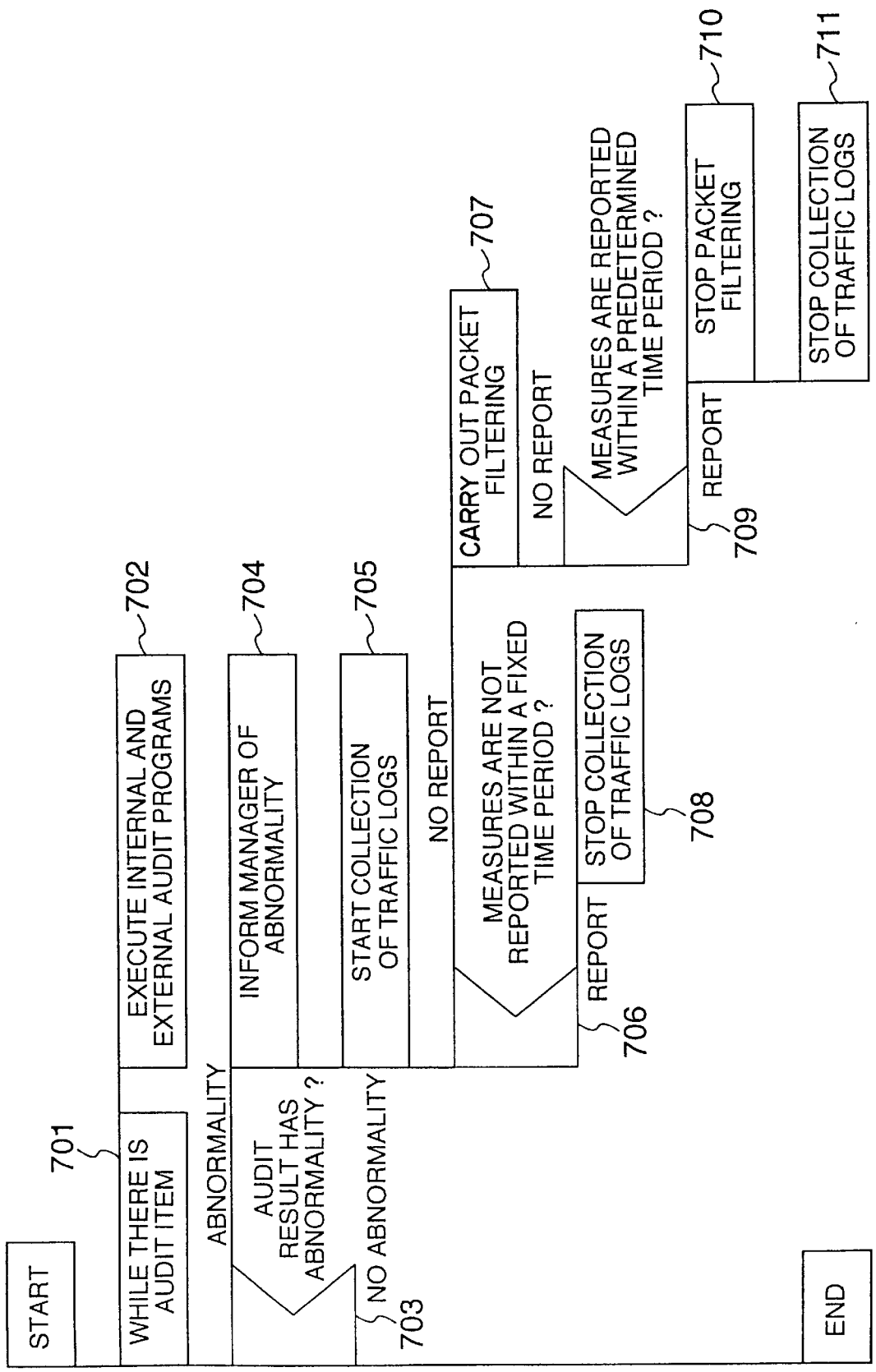

FIG. 14

| | COMPUTER NAME 1501 | SERVICE 1502 | AUDIT RESULT 1503 | PRIOR AUDIT 1504 | FILTERING 1505 |
|---|---|---|---|---|---|
| 1506 | 102a | APPLICATION A | ABNORMALITY | FINISHED | ABANDONMENT |
| 1507 | 102a | APPLICATION X | NO ABNORMALITY | FINISHED | ABANDONMENT |
| 1508 | 102a | APPLICATION Y | NO ABNORMALITY | FINISHED | ABANDONMENT |
| 1509 | 102a | SYSTEM | ABNORMALITY | FINISHED | ABANDONMENT |
| 1510 | 102b | APPLICATION B | NO ABNORMALITY | FINISHED | REPEATING |
| 1511 | 102b | SYSTEM | NO ABNORMALITY | FINISHED | REPEATING |

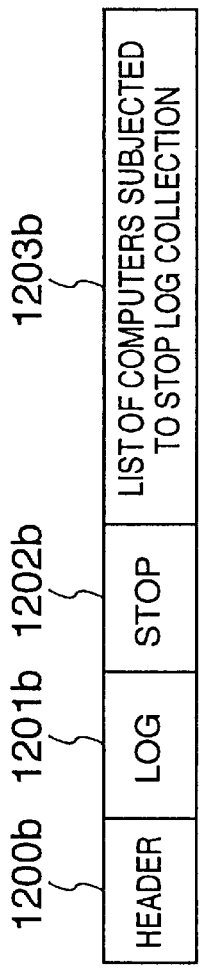
FIG.15A TRAFFIC LOG COLLECTION START PACKET
FIG.15B TRAFFIC LOG COLLECTION STOP PACKET
FIG.15C LOG INFORMATION DATA PACKET

NETWORK SYSTEM HAVING EXTERNAL/INTERNAL AUDIT SYSTEM FOR COMPUTER SECURITY

BACKGROUND OF THE INVENTION

The present invention relates in general to the technology relating to the security of computers connected to a network, and more particularly to a network system which is adapted to the audit the vulnerability of a computer and defend the computer against a unjust invader on the basis of the audit result.

Heretofore, as for a system for auditing the "vulnerability of a computer" connected to a network, i.e., the security problem of a computer, there are well known: (1) the technology wherein the audit for a personal computer is carried out from the inside of the computer so that vulnerability of the computer itself is detected in the inside of the computer; and (2) the technology wherein a packet or message for inquiring of a computer vulnerability is sent from a predetermined management unit to the computer via a network and on the basis of a response of the computer to the packet or message thus sent thereto, the vulnerability of the computer is detected by the management unit.

Now, "vulnerability" of a computer means, for example, (i) vulnerability of setting parameters which is set in such a way that while, originally, reference to a file "a" in a computer is permitted only to a user "a", a user "x" is also permitted to refer to the file "a"; and (ii) nonconformity of an application in which although, originally, an application on a computer does not receive a command "xxx", the command "xxx" is also received by the application.

More specifically, in the technology for auditing a computer from the inside of the computer, there is well known a COPS (Computerized Oracle and Password System), and also for the technology for auditing a computer by a management unit installed outside the computer there are well known a SATAN (Security Administrator Tool for Analyzing Network) and an ISS (Internet Security Scanner).

The COPS is shown in an article of "The Cops Security Checker System" by Daniel Farmer et al., Purdue University Technical Report CSD-TR-993, Sep. 19, 1991 for example, and the SATAN is shown in an article of "Security Administrator Tool for Analyzing Networks" for example.

Currently, the development of a global network such as the internet, results in information sent from every corner of the world being able to be obtained by a computer at home. On the other hand, however, each computer is exposed to the menace of an invader from the outside of the computer.

As counter measures for defending against such an unjust invader, it is important to audit the vulnerability of a computer and correct it since the possibility of an unjust intrusion to a computer can be reduced. If there is one computer in which vulnerability still exists, other computers in the periphery of the one vulnerable computer may be unjustly invaded.

Therefore, it will be necessary to take effective measures when an abnormality is found to be present in the auditing result.

In addition, when a large scale network system is constructed, there may not be adopted in some cases a structure such that the direct communication can be established between a management unit and computers as objects of the audit. Then, in such cases, the management unit can not concentratedly audit each of the computers.

SUMMARY OF THE INVENTION

It is therefore an object of the present invention to provide a network system which is capable of solving the above-mentioned problems associated with the prior art.

It is another object of the present invention to provide a network system which is designed in such a way that auditing of computers is carried out in a large scale network.

It is still another object of the present invention to provide a network system which is capable of preventing an invader from invading unjustly, when there is a computer having vulnerability, into any vulnerable computer.

According to an aspect of the present invention, there is provided a network system having a network which includes: at least one repeating installation connected to the network for carrying out the repeating of communication on the network; at least one computer connected to the network through the at least one repeating installation; and a management unit connected to the network, wherein the management unit has a distribution unit for distributing an external audit program for defining a processing procedure by which the repeating installation audits the vulnerability of the computer from the management unit to the repeating installation through the network, and the repeating installation has an audit control unit which serves to carry out an external audit processing with respect to the vulnerability of the computer in accordance with the external audit program, which has been distributed from the management unit, in order to judge whether or not the computer has the vulnerability.

According to another aspect of the present invention, there is provided a network system having a network which includes: at least one repeating installation connected to the network for carrying out the repeating of communication on the network; at least one computer connected to the network through the at least one repeating installation; and a management unit connected to the network, wherein the management unit has a distribution unit for distributing an internal audit program for defining a processing procedure by which vulnerability of the computer is audited by the computer itself from the management unit to the computer through both the network and the repeating installation, the computer has a unit which serves to carry out an internal audit processing with respect to the vulnerability of the computer in accordance with the internal audit program which has been distributed from the repeating installation in order to inform the repeating installation of the result of the internal audit processing, and the repeating installation has an audit control unit which serves to judge whether or not the computer has the vulnerability on the basis of the result of the internal audit processing reported from the computer.

According to such a network system, it is possible to update the audit program, which is executed by the repeating installation, into the newest and best audit program from the management unit whenever it is necessary. In addition, since the computer which is made an object of the audit processing by each of the repeating installations is the computer to which the associated repeating installation is directly connected (i.e., without through any other repeating installation), the communication can be necessarily and directly established between the repeating installation of interest and the computer of interest. In addition, it is possible to reduce the traffic of communication due to the audit for the computers. Therefore, it is possible to realize an auditing system which is suitable for a large scale network.

According to an example of the present invention, the external audit program which is distributed from the management unit to the repeating installation has both a message to an application program of the computer as an object of the audit and a proper response of the application program to the message when the computer as an object of the audit has no vulnerability. The audit control means of the repeating installation sends a message to the application program of the computer in response to the external audit program which has been distributed from the management unit thereto and compares the response of the application to the message from the computer with the proper response of the application program, thereby judging whether or not the computer has the vulnerability.

According to another example of the present invention, the internal audit program which is distributed from the management unit to the repeating installation has the proper setting information, when the computer as an object of the audit has no vulnerability, in at least one of a program, control information and data of the computer as an object of the audit, and the audit control means of the repeating installation reads out, in response to the internal audit program which has been distributed from the management unit thereto, the setting information in at least one of the program, control information and data of the computer from the computer and then compares the setting information thus read out with the corresponding proper setting information which the internal audit program has, thereby judging whether or not the computer has the vulnerability.

According to an example of the present invention, the repeating installation further stops, when it is judged as the result of the external or internal audit processing executed by the audit control unit that the computer has the vulnerability, the repeating of communication to and/or from the computer which is transmitted on the network.

According to such a network system, the communication with the computer in which its operation environment does not match the regular operation environment does not reach the computer of interest. Therefore, it is possible to prevent the unjust invasion into such a computer.

BRIEF DESCRIPTION OF THE DRAWINGS

FIG. 9 is a view showing a procedure of a concrete example of the external audit of FIG. 8;

FIG. 10 is a view showing a procedure of an example of an audit for a computer from the inside of the computer;

FIG. 11 is a view showing a procedure of a specific example of the internal audit of FIG. 10;

FIG. 12A is a view showing an example of an audit packet and an audit response packet which are used in the external audit;

FIG. 12B is a view showing an example of an audit implementation instruction packet which is used in the internal audit;

FIG. 12C is a view showing an example of an audit result packet which is used in the internal audit;

FIG. 13A is a view showing an example of verification and a processing procedure of the audit result in the router of FIG. 2;

FIG. 14 is a view showing an example of filtering information stored in the router of FIG. 2;

FIG. 15A is a view showing an example of a packet for starting the log collection;

FIG. 15B is a view showing an example of a packet stopping the log collection;

FIG. 15C is a view showing an example of a packet for transmitting the log information.

DESCRIPTION OF THE PREFERRED EMBODIMENTS

The preferred embodiments of a network system according to the present invention will hereinafter be described with reference to the accompanying drawings.

Figure 1:
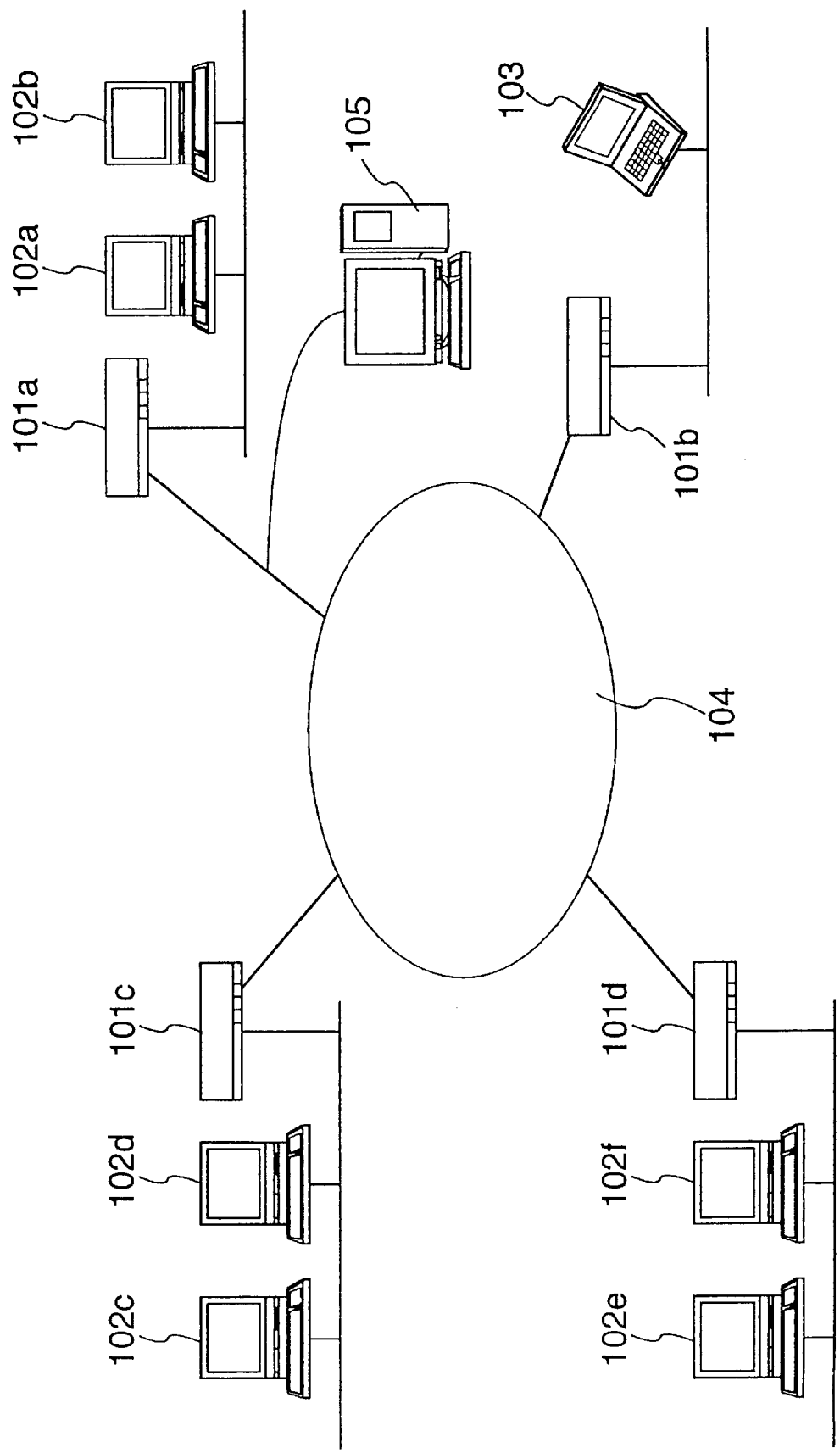
FIG. 1 is a block diagram showing the overall structure of a network system according to an embodiment of the present invention.

FIG. 1 is a block diagram showing the overall structure of a network system according to a first embodiment of the present invention.

In the figure, reference numeral 103 designates a management unit for specifically auditing computers which are connected to a LAN, private or dedicated lines and the like constituting a network 104. Reference numerals 101a to 101d respectively designate repeating installations each of which carries out the routing in accordance with a predetermined communication protocol such as a TCP (Transmission Control Protocol)/IP (Internet Protocol), or an OSI (Open Systems Interconnection) protocol. Incidentally, in the present embodiment, a router is employed as an example of the repeating installation. Reference numerals 102a to 102f designate respectively computers which are installed in the respective user sites. Reference numeral 105 designates a log collector which serves to collect logs of the processing from the computers and logs of the traffic on the network. The log collector 105 may be connected to any position of the network.

Incidentally, while the present embodiment, for the transfer of the data packet between the units, the transfer function such as a TCP (Transmission Control Protocol)/IR (Internet Protocol) or an OSI (Open Systems Interconnections) is used. Each of the repeating installations 101a to 101d is provided with a filtering function for carrying out the repeating and abandonment 5 of the data packet.

While in the embodiment shown in FIG. 1, there is shown an example in which a plurality of repeating installations are connected to the network and also at least one computer is connected to each of the repeating installations, the present invention is not limited thereto. That is, it is understood that the present invention can also be applied to the network system in which at least one repeating installation is connected to the network and also at least one computer is connected to each of the repeating installations.

Figure 2:
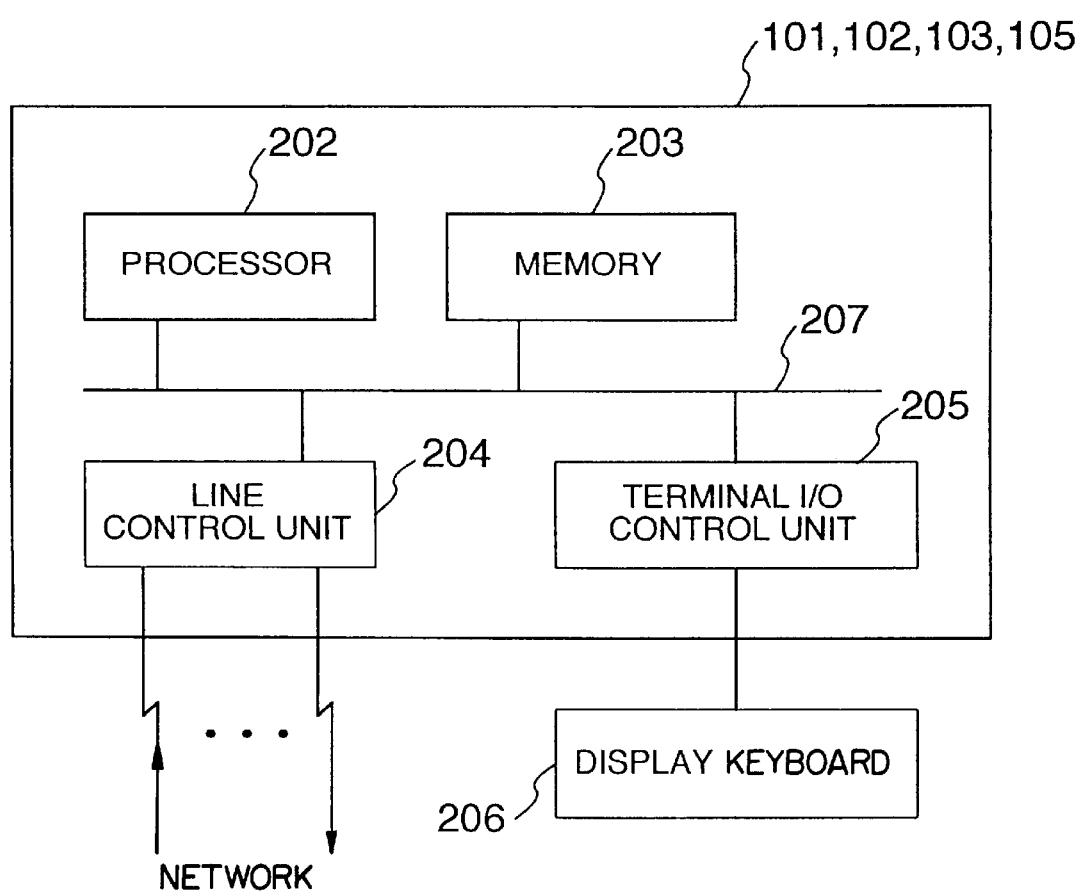
FIG. 2 is a block diagram showing an example of a hardware structure of each of a router, a management unit, a computer and a log collector shown in FIG. 1.

Next, referring to FIG. 2, there is shown an example of a hardware structure of each of the router 101, the management unit 103, the user-site computer 102 and the log collector 105.

In the figure, reference numeral 204 designates a line control unit for controlling the operation of inputting/ outputting data to/from a LAN, private lines and the like constituting the network. Reference numeral 205 designates a terminal I/O control unit for controlling a display keyboard 206. Reference numeral 203 designates a memory for storing therein programs and transmission/reception message. Reference numeral 202 designates a processor for carrying out the control for each of the portions in the system. The number of lines accommodated in the line control unit 204 is different depending on the units. In the case of each of the computer 102 and the management unit 103, a minimum of one line may be accommodated therein, while in the case of the router 101, a minimum of two lines used to carry out the repeating of the packet may be accommodated therein. In addition, in the case of the log collector, one or more lines which are used to collect the logs of the traffic may be accommodated therein.

In addition, reference numeral 207 designates a bus through which the units 202 to 205 are connected.

In the following description, the processor, the memory, the line control unit, the terminal I/O control unit, the display keyboard, the bus of the router 101 are respectively designated by reference numerals 1202, 1203, 1204, 1205, 1206 and 1207; the processor, the memory, the line control unit, the terminal I/O control unit, the display keyboard and the bus of the computer 102 are respectively designated by reference numerals 2202, 2203, 2204, 2205, 2206 and 2207; the processor, the memory, the line control unit, the terminal I/O control unit, the display keyboard and the bus of the management unit 103 are respectively designated by reference numerals 3202, 3203, 3204, 3205, 3206 and 3207; and the processor, the memory, the line control unit, the terminal I/O control unit, the display keyboard and the bus of the log controller 105 are respectively designated by reference numerals 5202, 5203, 5204, 5205, 5206 and 5207.

Figure 3:
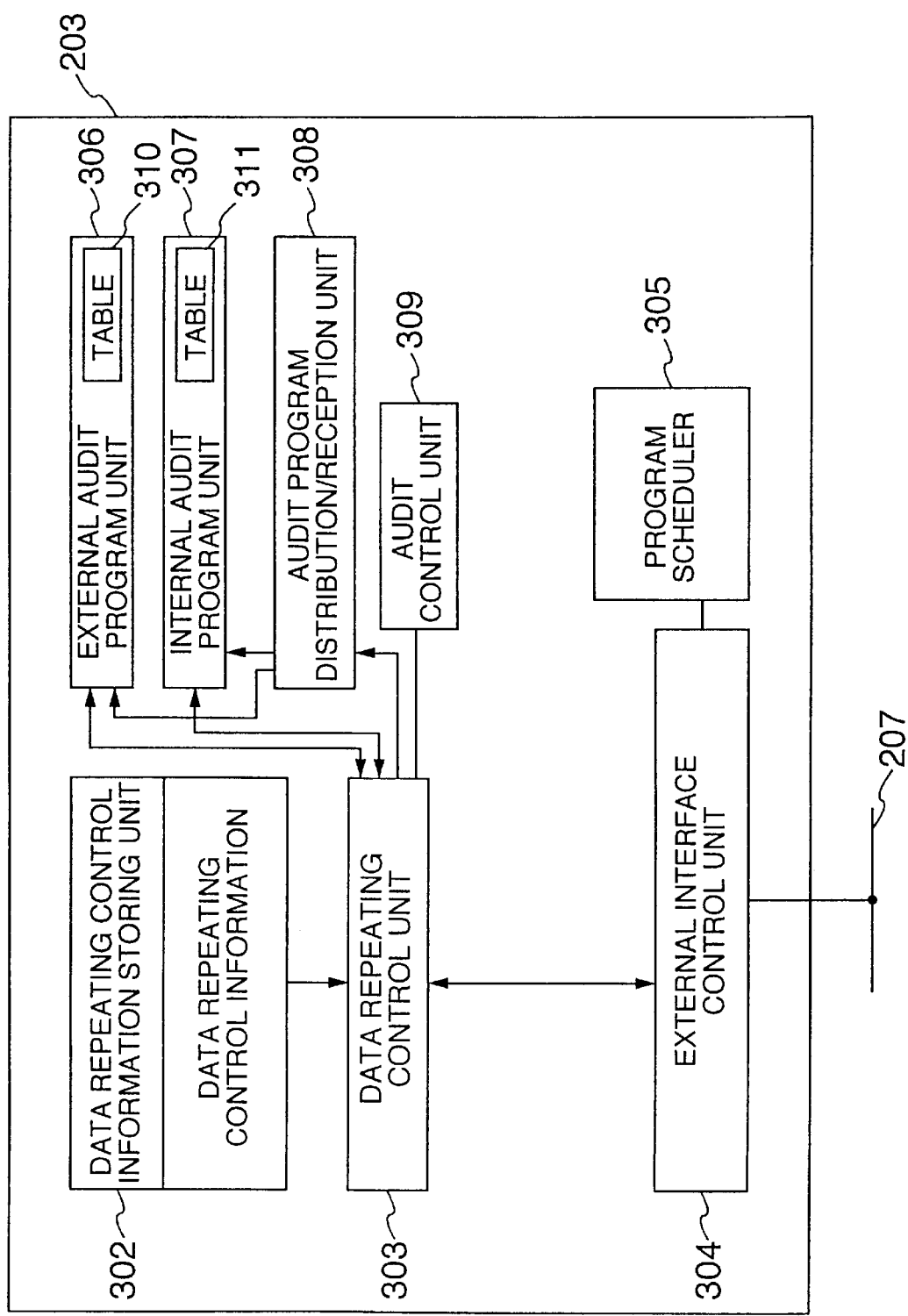
FIG. 3 is a block diagram showing an example of a configuration of a memory in the router shown in FIG. 2.

Next, referring to FIG. 3, there is shown an example of a configuration of the memory 203 of the router 101.

In the figure, reference numeral 302 designates a routing table for storing therein the repeating control information which is used to carry out the transfer and filtering of the data packet. A data repeating control unit 303 controls the filtering of the data packet and the transfer of the data packet to the objective computer through an external interface control unit 304 on the basis of the repeating control information. Reference numeral 304 designates the external interface control unit for controlling the operation of inputting/outputting data to/from the network and the operation of inputting/outputting data to/from an external I/O unit. Instead of providing the memory 203 with the control unit 304, the control unit 304 may be installed in the line control unit 204 and the terminal I/O control unit 205, respectively. Reference numerals 306 and 307 designate an internal program unit and an external program unit for storing therein an internal and external audit program group, respectively. Reference numeral 308 designates an audit program distribution/reception unit for controlling both reception of the newest internal audit program and external audit program which are distributed from the management unit 103, and distribution of the distributed internal audit program to each of the computers. An audit control unit 309 executes the processing such as notification of abnormality in accordance with the audit result. A program scheduler 306 carries out both scheduling and management for execution of the programs in the units 301 to 309. Reference numeral 310 designates a table which is provided in the external audit program unit 307 and which will be described later.

All of the units 302 to 310 may be constructed in the form of software or a part thereof may be constructed in the form of hardware.

Figure 4:
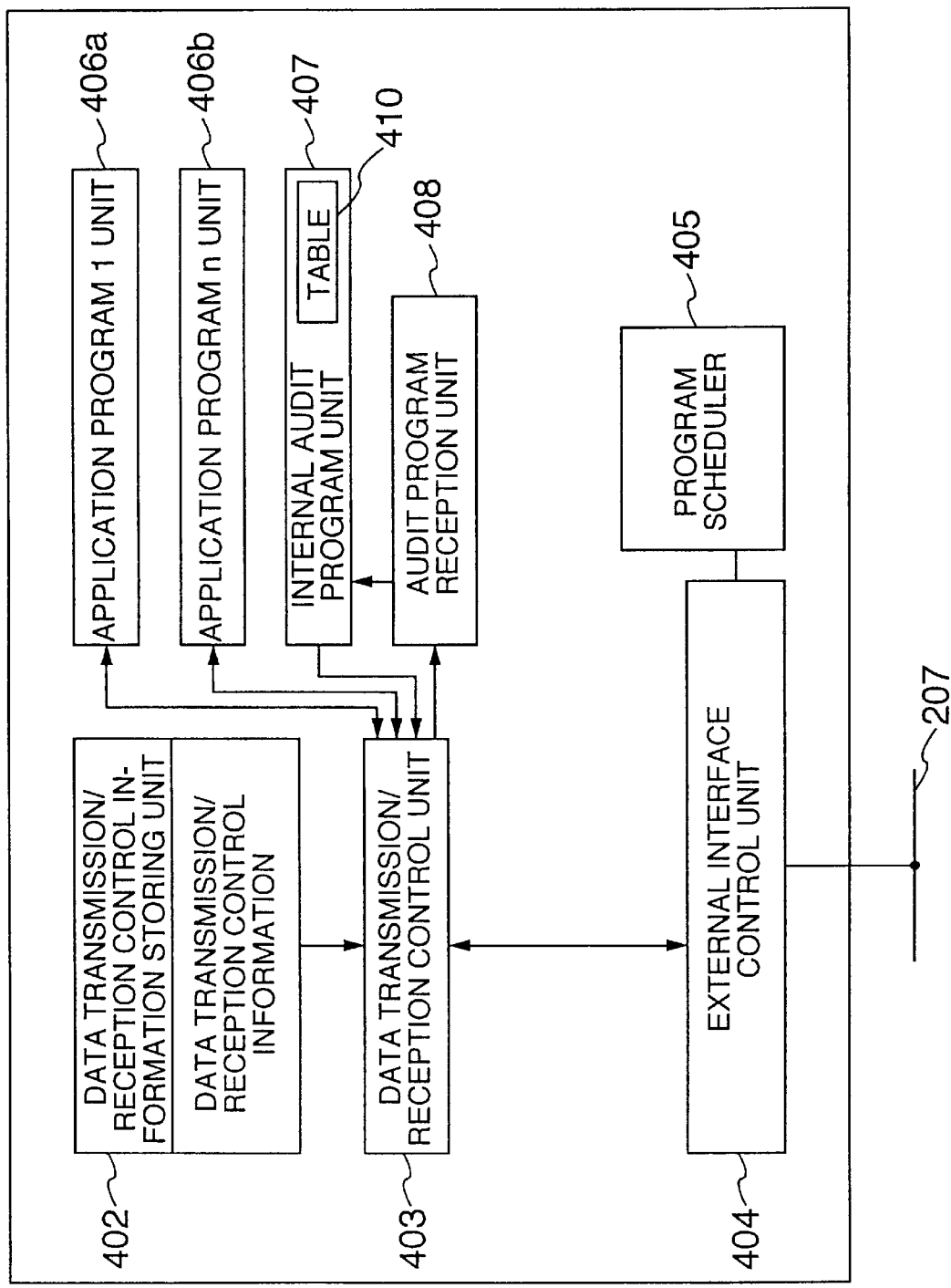
FIG. 4 is a block diagram showing an example of a configuration of a memory in the computer shown in FIG. 2.

FIG. 4 is a block diagram showing an example of a configuration of the memory 203 in the computer 102 shown in FIG. 2.

In the figure, reference numeral 402 designates a storage unit for storing therein data transmission/reception control information as route information which is used to transmit/ receive the data packet. Reference numeral 403 designates a data transmission/reception control unit for carrying out transmission/reception of the data packet to/from the objective computer through an external interface control unit 404 on the basis of the data transmission/reception control information. Reference numeral 404 designates the external interface control unit for controlling the operation of inputting/outputting data to/from the network and the operation of inputting/outputting data to/from an external I/O unit. The control unit 404 may be, instead of being provided in the memory 203, provided in the line control unit 204 and the terminal I/O control unit 205, respectively. Reference numerals 406a to 406b designate application program units for storing therein application programs 1 to n which are run on the computers, respectively. Reference numeral 407 designates an internal audit program unit for storing therein the internal audit program, and reference numeral 408 designates an audit program reception unit for receiving the internal audit programs which are distributed from either the router 101 or the management unit 103. A program scheduler 405 carries out both scheduling and management for execution of the programs in the units 402 to 408. Reference numeral 410 designates a table which is provided in the internal audit program unit 407 and which will be described later.

All of the units 402 to 410 may be constructed in the form of software, or a part thereof may be constructed in the form of hardware.

Figure 5:
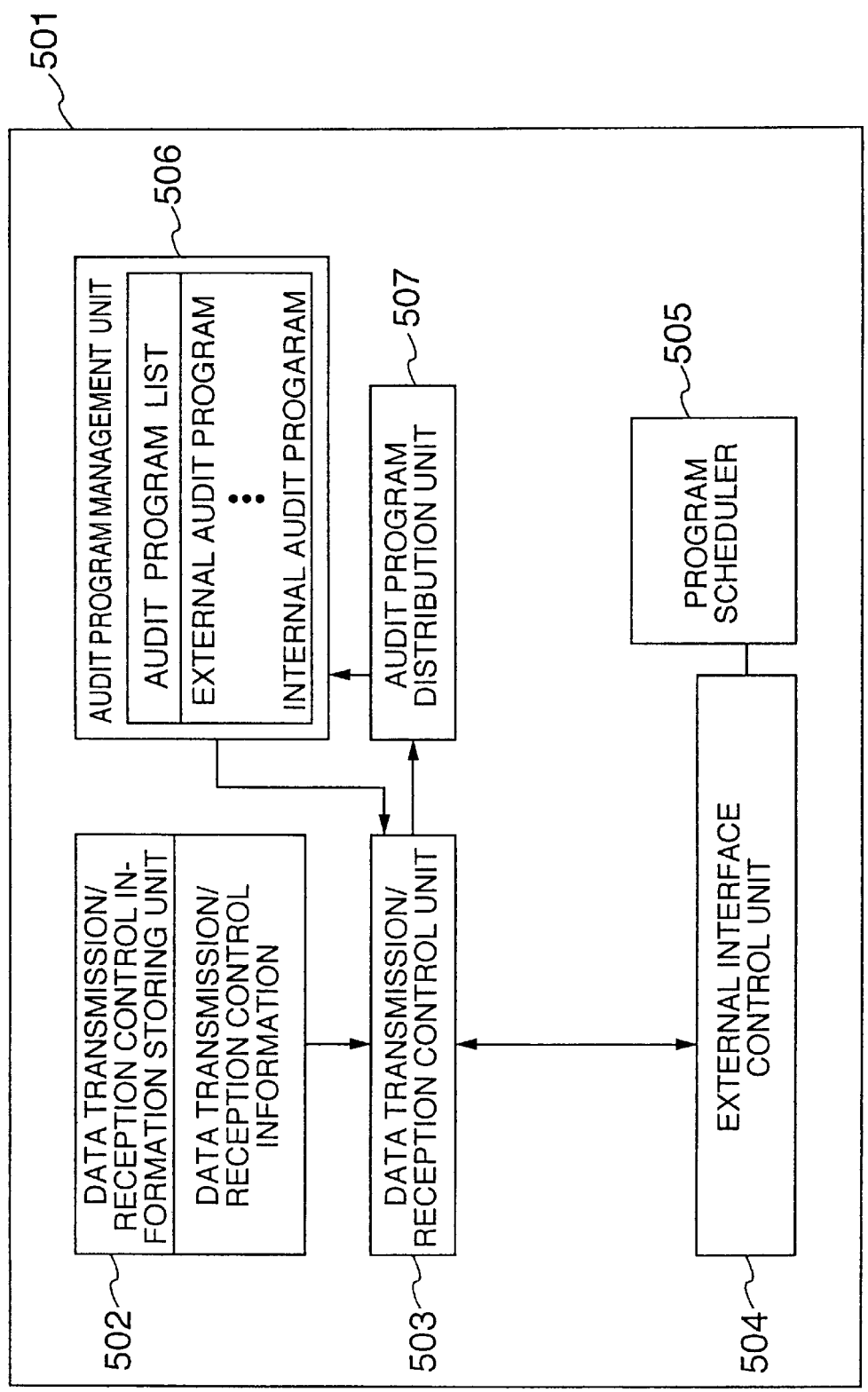
FIG. 5 is a block diagram showing an example of a configuration of a memory in the management unit shown in FIG. 2.

FIG. 5 is a block diagram showing an example of a configuration of the memory 203 in the management unit 103 shown in FIG. 2.

In the figure, reference numeral 502 designates a storage unit for storing therein data transmission/reception control information as route information which is used to transmit/ receive the data packet. Reference numeral 503 designates a data transmission/reception control unit for carrying out transmission/reception of the data packet to/from the objective computer through the external interface control unit 504 on the basis of the data transmission/reception control information. Reference numeral 504 designates an external interface control unit for controlling the operation of inputting/outputting data to/from the network and the operation of inputting/ outputting data to/from an external I/O unit. Reference numeral 506 designates an audit program management unit for storing therein an audit program group, which is distributed to each of the routers and each of the computers, in order to manage the audit program group thus stored on the basis of a self-contained audit program list. Reference numeral 507 designates an audit program distribution unit 507 for distributing the newest audit program to each of the routers. A program scheduler 505 carries out both scheduling and management for execution of programs in the units 402 to 408.

All of the units 502 to 507 may be constructed in the form of software, or a part thereof may be constructed in the form of hardware.

The control unit 504 may be, instead of being provided in the memory 203, provided in the line control unit 204 and the terminal I/O control unit 205, respectively.

Figure 6:
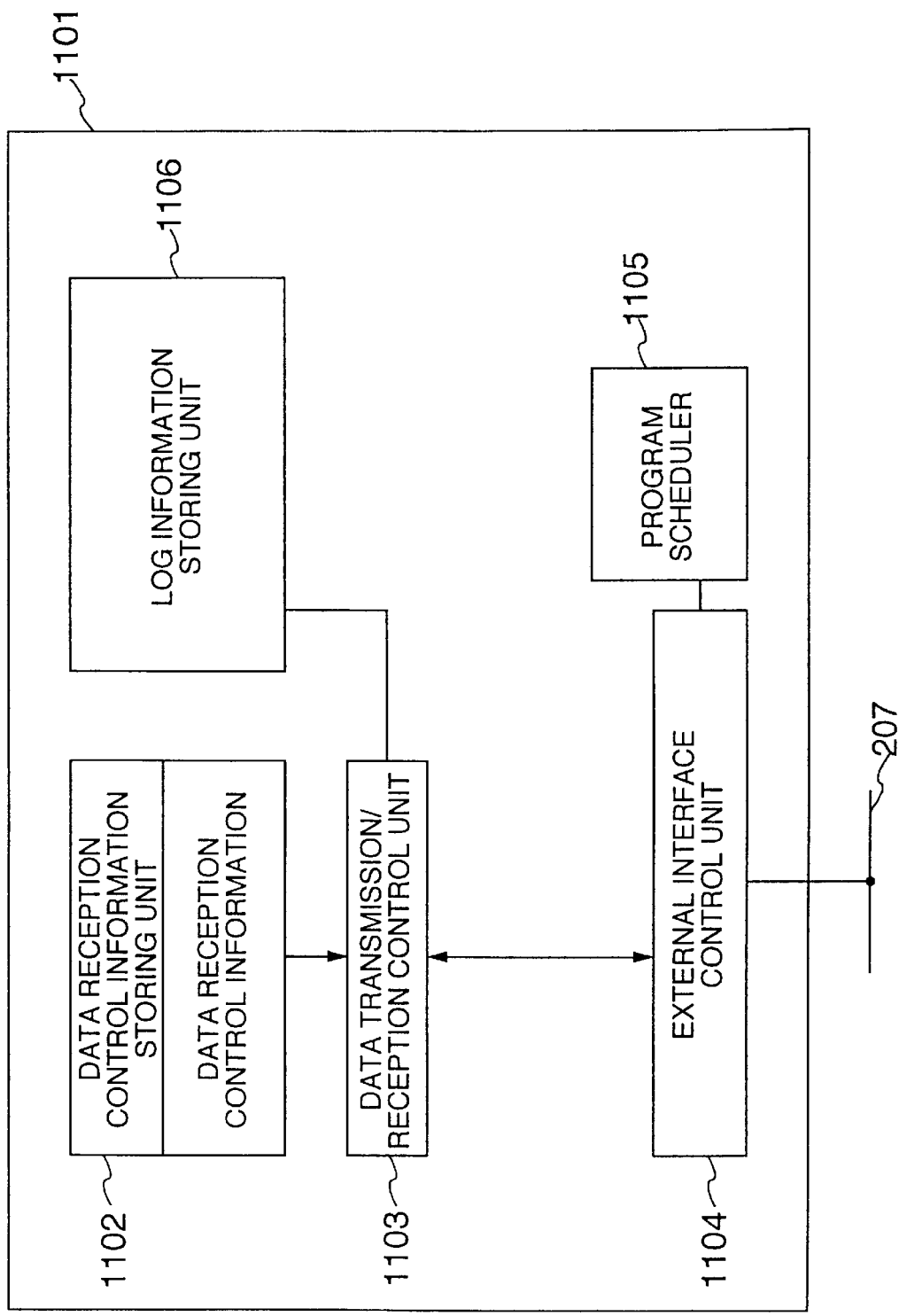
FIG. 6 is a block diagram showing an example of a configuration of a memory in the log collector shown in FIG. 2.

FIG. 6 is a block diagram showing an example of a configuration of the memory 203 in the log collector 105.

In the figure, reference numeral 1102 designates a storage unit for storing therein data reception control information as control information which is used to receive the data packet. Reference numeral 1103 designates a data transmission/reception control unit for transmitting/receiving the data packet through the external interface control unit 1104 on the basis of the data reception control information. Reference numeral 1104 designates an external interface control unit for controlling the operation of inputting/outputting data to/from an external I/O unit. Reference numeral 1106 designates a log information storing unit for storing therein the log information. A program scheduler 1105 carries out both scheduling and management for execution of the programs in the units 1102 to 1108.

All of the units 1102 to 1106 may be constructed in the form of software, or a part thereof may be constructed in the form of hardware.

In this connection, the control unit 1104 may be, instead of being provided in the memory 203, provided in the line control unit 204 and the terminal I/O control unit 205, respectively.

The present log collector 105 has the following features.
(a) As shown in FIG. 1, the log collector 105 is connected to the branch line into which the regular connection line, such as a LAN or a private line, constituting the network branches in order to collect the data flowing on the network. This means that the log collector 105 fetches the data flowing on the network as a third party with respect to the computer 102, the router 101 and the management unit 103.
(b) The log collector 105 does not have network addresses which are used in the TCP/IP, the OSI and the like. The network addresses shown here are meant for an IP (Internet Protocol) address and an NSAP (Network Service Access Point) address. Therefore, it is impossible for the network address of the present log collector 105 to be clearly specified as the destination from the management unit 103, the router 101 or the computer 102 in order to transmit the message and the data packet. In addition, it is also impossible for the network address of the management unit 103, the router 101 or the computer to be specified as the destination from the log collector 105 in order to transmit the message.

As a result, it is very difficult for the log collector 105 to be invaded through the network so as to alter or destroy the log information which is stored in the log collector 105.

In the configuration as described above, the management unit 103 distributes both the external audit programs and the internal audit programs to each of the routers 101 through the network. In addition, each of the routers 101 distributes the internal audit program which is to be executed on the associated computers 102, which are connected to only the router of interest, out of the internal audit programs, which have been distributed from the management unit 103, to the associated computers 102. That is, the router 101a distributes the internal audit program to both of the computers 102a and 102b. In such a way, as for the internal audit programs, there is the program which is executed on the router and the program which is executed on the computers associated with the router. The internal audit program which is executed on the router carries out both activation of the internal audit program which is executed on the computers and verification of the audit result provided by the internal audit program which is executed on the computers.

In the present invention, there may be adopted the procedure in which the internal and/or external audit programs are not distributed to all of the routers 101a, 101c and 101d, but are distributed to a part thereof so that the audit is carried out for the computers which are respectively connected to these routers. In addition, while in a certain router, the audit may be carried out for all of the computers which are connected to only the certain router, the audit may be carried out for only a part of these computers.

The description will hereinbelow be given with respect to the procedure of distributing the internal and external audit programs in the present embodiment.

Figure 7:
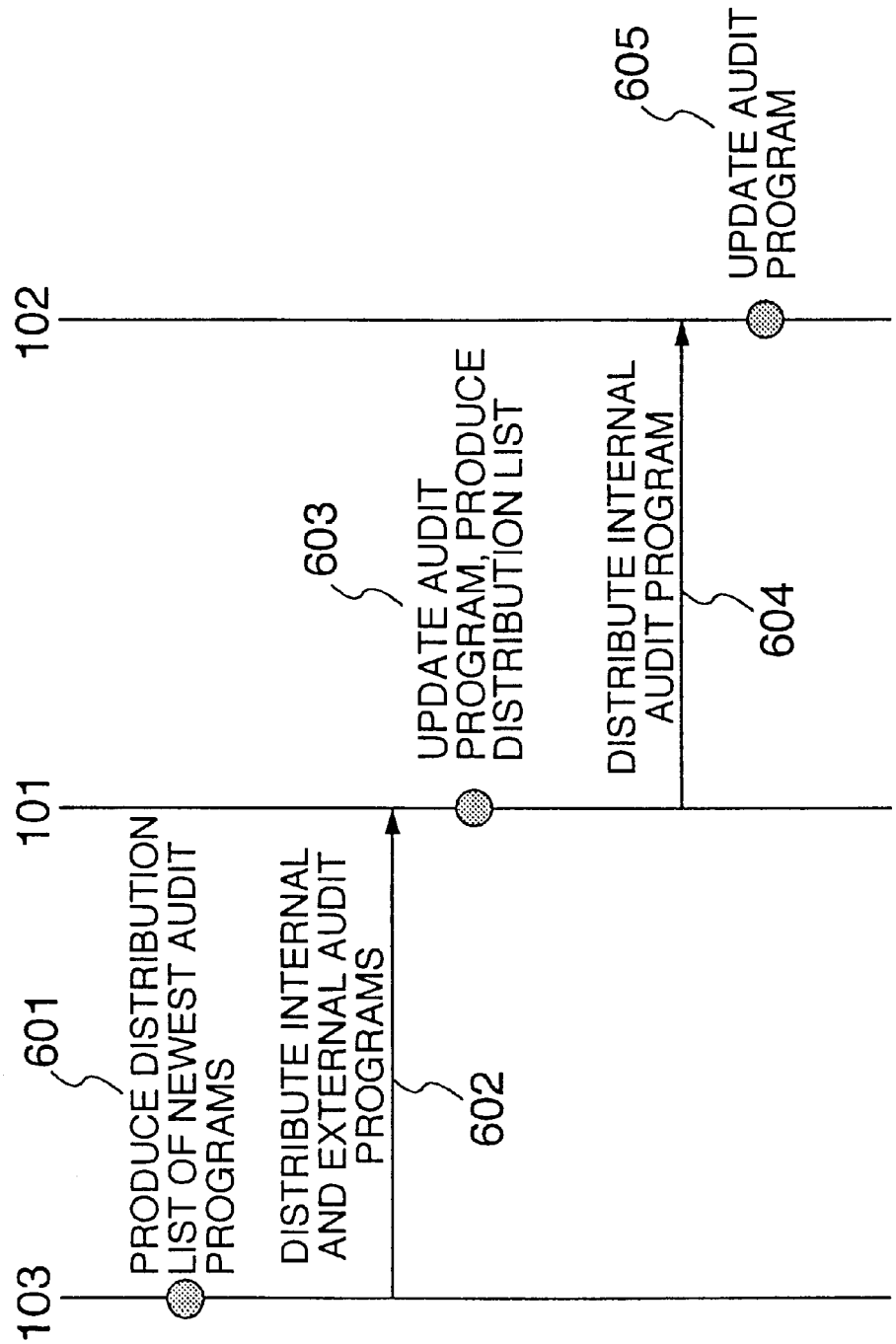
FIG. 7 is a view showing a procedure of distributing internal and external audit programs.

Referring to FIG. 7, there is shown a sequence of distributing the internal and external audit programs.

As shown in the figure, first, the management unit 103 produces a list of the newest audit programs in the audit program management unit 506 (Step 601).

The audit program distribution unit 507 reads out the newest internal and external audit programs from the audit program management unit 506 by reference to the list thus produced. Then, the internal and external audit programs thus read out are transmitted to the LAN 104 through the data transmission/reception control unit 503, the external interface control unit 504, the bus 5207, the line control unit 5204 and the router 101b so as to be distributed to the router 101 which carries out the audit from the outside of the computer (Step 602). Which router the internal and external audit programs will be sent to is set in the audit program distribution unit 507.

In the management unit 103, the destinations of the newest internal and external audit programs can be input using the input unit, e.g., the display keyboard 5206 so as to be set in the audit program distribution unit 507 through the terminal I/O control unit 5205, the external interface control unit 504, and the data transmission/reception control unit 503. Likewise, the destinations of the newest internal and external audit programs can be input using the input unit, e.g., the display keyboard 5206, so as to be sent in the audit program distribution unit 507 through the terminal I/O control unit 5205, the external interface control unit 504 and the data transmission/ reception control unit 503.

In the router 101, the data repeating control unit 303 thereof receives the internal and external audit programs from the LAN 104 through the line control unit 1204 and the external interface control unit 304 and then judges therein whether or not the internal and external audit programs thus received are the internal and external audit programs which have been addressed to its router 101. When the received internal and external audit programs are distributed with its router 101 as the destination, the data repeating control unit 303 sends the internal and external audit programs to the audit program distribution/reception unit 308. Then, the audit program distribution/reception unit 308 updates the internal and external audit programs which are stored in the internal and external audit program units 306 and 307, respectively, into the newest internal and external audit programs which have been received. In addition, the audit program distribution/reception unit 308 produces a list of the updated internal audit programs which are to be distributed to the user-site computers, i.e., the computers 102 connected to only its router 101 (Step 603). Thereafter, the audit program distribution/reception unit 308 reads out the updated internal audit programs from the internal audit program unit 307 by reference to the list thus produced. Then, the internal audit programs thus read out are distributed to the computers 102, which are connected to its router 101, through the data repeating control unit 303, the external interface control unit 304, the bus 1204 and the line control unit 1204 (Step 604).

Which computers the internal audit programs are sent to is set in the audit program distribution/reception unit 308 by inputting the destinations using the input unit, e.g., the display keyboard 1206.

In each of the computers 102, the data transmission/ reception control unit 403 receives the internal audit programs from the router 101, which is directly connected to the associated computer 102, through the line control unit 4204 and the external interface control unit 404. Then, the data transmission/reception control unit 403 judges whether or not the internal audit programs thus received are the internal audit programs which have been addressed to its computer. When the received internal audit programs are the internal audit programs which have been addressed to its computer, the data transmission/reception control unit 403 sends the received internal audit programs to the audit program reception unit 408. Then, the audit program reception unit 408 updates the internal audit programs, which are stored in the internal audit program unit 407, into the newest internal audit programs thus received (Step 605).

In such a way, the distribution of the newest internal and external audit programs from the management unit 103 to the associated router and computers is completed.

The procedure may be adopted in which the program of the processings executed in the audit control unit 309 of the router 101 is, likewise, distributed together with the external audit program from the management unit 103 to the router 101, and the router 101 successively updates that program. In addition, in the management unit and the router, the distribution of the internal and external audit programs can be carried out by utilizing the message transfer function such as file transfer, a network management system or a mail. In addition, in order to prevent the wire tapping of the audit program itself when distributing the programs, the data packet may be encrypted using a common key or a public key. In addition, in order to prevent the revision of the data, a digital signature may be added to the program. Further, in order to specify the proper unit from which data is transmitted and the destination computer, the authorization mechanism such as a user name and a password may be added. As a result, in the distribution of the audit programs as well, the improvement in safety can be promoted. The technology for improving the safety of programs is realized in a PEM (Privacy Enhanced Mail), a PGP (Pretty Good Privacy), an SNMP2 (Simple Network Management Protocol 2) and the like.

When the internal and external audit programs have been distributed in such a way, the router 101 executes the external audit program distributed thereto, thereby executing the audit from the outside with respect to the computers which are directly connected to its router. In addition, each of the computers executes the internal audit program distributed thereto, thereby executing its audit from the inside of the computer of interest. Incidentally, to each of the routers 101, the computers with which the router of interest can directly carry out communication (without any other router) are assigned as the computer 102 for which the router of interest is to carry out the audit in accordance with the external audit program, and the computer to which the internal audit program is to be distributed.

The description will hereinbelow be given with respect to an example of the procedure of the audit for each of the computers which is carried out from the outside and the inside.

First, the description will hereinbelow be given with respect to an example of the procedure of the audit for a computer which is carried out from the outside of the computer with reference to FIG. 8.

The router 101, e.g., the router 101a, activates and executes the external audit program in the external audit program unit 306 under the control of the program scheduler 305 and the audit control unit 309, and then transmits an audit packet 901a for the application program (e.g., the application program 1) of the computer 102, e.g., the computer 102a as an object of the external audit to the computers 102a and 102b each of which is made an object of the audit by the router 101a through the data repeating control unit 303 and the external interface control unit 304.

The formats of the various packets which are transmitted between the router 101 and the computer 102 in the external/ internal audit are shown in FIGS. 12A to 12C.

FIGS. 12A to 12C show the formats of the various packets, respectively. As shown in the figures, each of these packets includes, in addition to a header portion, three fields. A kind of packet is stored in a first field, data relating to an operation method is stored in a second field, and data to be transferred is stored in a third field.

In an audit packet and an audit response packet 901 which are used during the external audit, as shown in FIG. 12A, both the data relating to the unit from which the packet is transmitted and the destination thereof are set in a header portion 800a, "data" is set in a first field 801a indicating a kind of packet, "null" is set in a second field 802a indicating the operation method, and "message" which is transmitted to the application on the computer is set in a third field 803a in which data to be transferred is stored.

"Null" set in the second field 820a does not indicate that the content of the packet of interest is "the operation method", but simply indicates that only the data is transmitted.

In the computer 102a, the data transmission/reception control unit 403 receives the audit packet 901a from the router 101a through the line control unit 4204, the bus 4207 and the external interface control unit 404. Then, the data transmission/reception control unit 403 judges, on the basis of the header portion 800a of the received audit packet 901a, whether or not the received audit packet 901a is the packet which has been addressed to the computer 102a. In this case, since the audit packet 901a has been addressed to the computer 102a, it is judged on the basis of the field 803a of the audit packet that the audit packet has been transmitted for the application program 1, and then the audit packet 901a is sent from the data transmission/reception control unit 403 to the application program 1 unit.

The application program 1 unit is operated in response to the message stored in the field 3(803a) of the audit packet 901a and then transmits a response packet 902a in which the operation result is stored in the form of message in the field 3(803a) to the data transmission/reception control unit 403 (Step 903a). Then, the response packet 902a is sent to the router 101a from the data transmission/reception control unit 403 through the external interface control unit 404, the bus 4207 and the line control unit 204.

The audit packet is provided so as to correspond to the application program of the computer. For example, if the audit packet corresponds to a request for the setting parameters of the application program, then the request is described in the message of the audit packet 901 to that effect. In response thereto, the response packet 902 has the setting parameters of the application program of interest described therein in the form of a message.

In the router 101a, the data repeating control unit 303 receives an audit response packet 902a through the line control unit 3204, the bus 3207 and the external interface control unit 304. Then, the data repeating control unit 303 judges, on the basis of the header portion 800a of the audit response packet 902a thus received, whether or not the audit response packet 902a thus received is the audit response packet which has been addressed to the router 101a of interest. In this case, since the audit response packet 902a is the audit response packet which has been addressed to the router 101a of interest, the data repeating control unit 303 transmits the audit response packet 902a to the external audit program unit 306. Then, the external audit program unit 306 compares the contents indicated in the message of the received audit response packet 902a with the corresponding contents of the table 310 (i.e., the contents of the message of the audit response packet when the computer 102a as an object of the audit has no vulnerability), thereby judging whether or not the computer 102a has the vulnerability (Step 904a).

The external audit program which is supplied from the management unit 103 includes "the message" for the application program of the computer as an object of the audit as well as "the contents of the message of the audit response packet when the computer as an object of the audit has no vulnerability (i.e., the proper response of the application program to the message). When the external audit program is stored in the router 101 from the management unit 103, "the contents of the message of the audit response packet when the computer as an object of the audit has no vulnerability" is stored in the table 310.

The contents of the table 310 are updated whenever the external audit program in the external audit program unit 306 is updated, and also are set for every computer as an object of the audit and audit contents contained in the external audit program. As an example in which the computer has the vulnerability, there may be the case wherein, though the response message of the computer 102a to the message to the computer 102a should be "error", it becomes "OK", and so forth.

Figure 8:
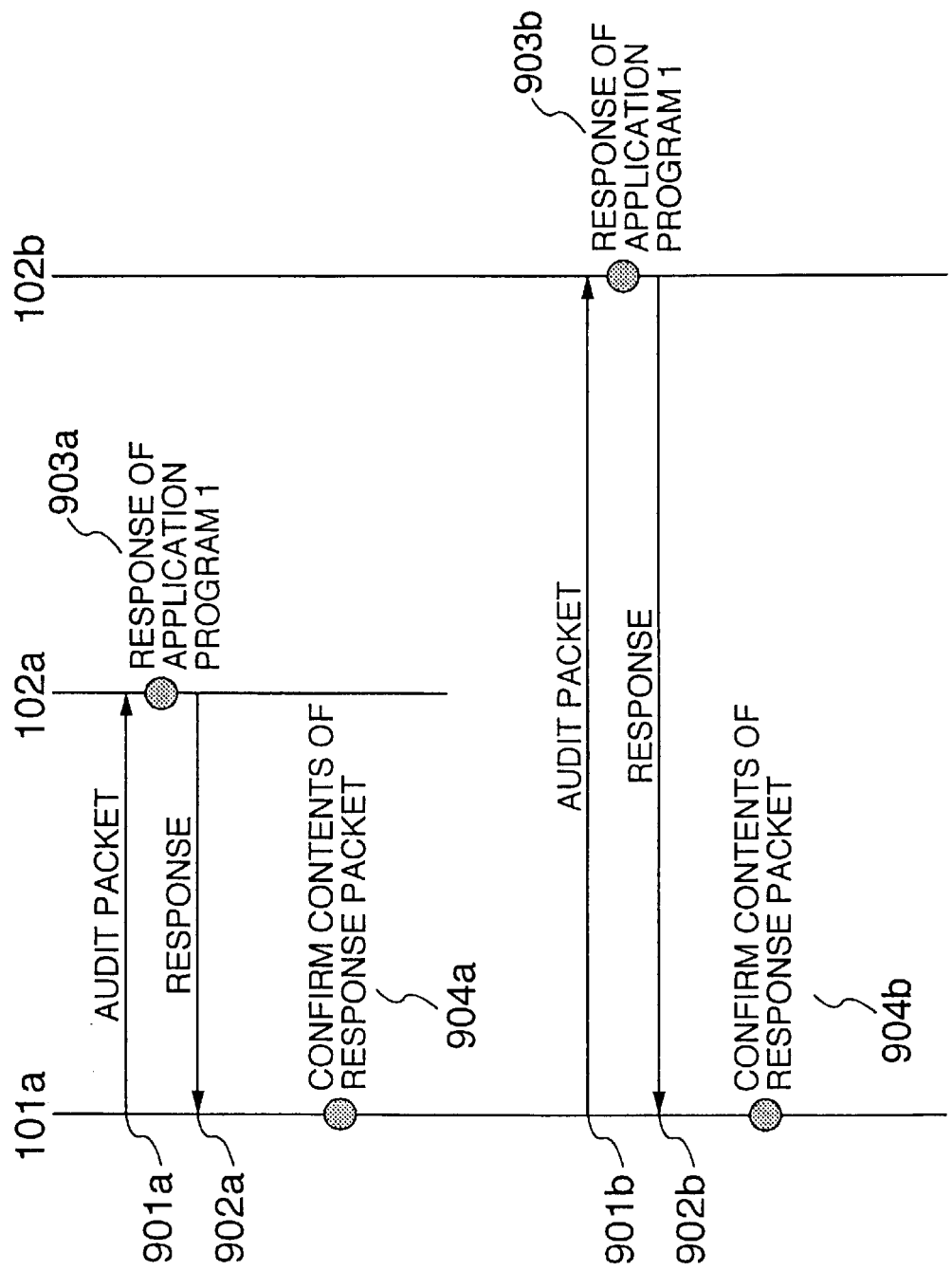
FIG. 8 is a view showing a procedure of an example of an audit for a computer from the outside of the computer.

Likewise, as shown in FIG. 8, the router 101a sends the audit packet 901b to the application program unit (e.g., the application program 1 unit) as well of another computer 102b, and receives the audit response packet 902b of the application program 1 unit to the audit packet 901b thus sent in order to judge whether or not the computer 102b has the vulnerability (Steps 903b and 904b).

Incidentally, in the router, the procedure may be adopted in which the audit packets 901a and 901b are transmitted in parallel to each other, and the audit response packets 902a and 902b to the audit packets 901a and 901b are received in parallel to each other. In addition, the procedure may be adopted that after the audit packet 901a is first transmitted and the audit response packet 902a to the audit packet 901a is received, the audit packet 901b is transmitted and then the audit response packet 902b to the audit packet 901b—30 is received.

In such a way, the external audit is carried out for each of the computers from the associated router, whereby even when the management unit cannot communicate directly with the computer as an object of the audit for some circumstance or another, it is possible to realize the audit for the computer as an object of the audit from the outside. Therefore, as the whole network, the traffic in the audit can be reduced as compared with the case where the external audit is carried out specifically from the management unit.

FIG. 9 is a view showing an operation sequence of a specific example of the external audit. For example, it is assumed that it is the condition for maintaining the operation environment having compatibility that the application programs A and B which are running on the computers 102a and 102b, respectively, send back, after having received the packet having a "TEST" command as a message, in response thereto, the packet that the "TEST" command is a command which can not be recognized. The router 101a transmits the packets 1301a and 1301b each having the "TEST" command as the message, as the audit packet to the application programs A and B running on the computers 102a and 102b, respectively. It is assumed that the application program A on the computer 102a sends back, in response to the audit packet 1301a, the response packet 1302a having the data of "OK" as the message which indicates that the command can be received (Step 1303a). Then, the router 101a compares the message "OK" of the response packet 1302a with the corresponding proper message of "the TEST command is a command which cannot be recognized" stored in the table 301. In this case, since the two messages do not match each other, the router of interest judges that the application program A of the computer 102a does not fulfill the operation environments, i.e., the computer 102a has the vulnerability, i.e., the audit results have abnormality (Step 1304a). On the other hand, it is assumed that the application program B on the computer 102b sends back the response packet 1302b having the data, as the message, of "the TEST command is a command which can not be recognized" indicating that reception can not be carried out (Step 1303b). In this case, since the two messages match each other and hence the conditions of the operation environments are fulfilled, the router 101a judges that the computer 102b has no vulnerability, i.e., the audit results have no abnormality (Step 1304b).

The audit results are retained in the log information storing unit included in each of the external audit program units 306 in the router with {execution time, existence and non-existence of abnormality, the reception message unit (803a)} as a set. In the case of the router 101a, since the log collector 105 is connected to the user-site network 104, the audit results are stored in a log information unit 1203c of a log information data packet 1202c shown in FIG. 15C, and then are transmitted on the network, whereby it is possible to store the resultant log information in the log collector 105.

Next, the description will hereinbelow be given with respect to an example of the procedure of the audit for a computer from the inside of the computer.

First, the router 101, e.g., the router 101a activates and executes the internal audit program in the internal audit program unit 307 under the control of the program scheduler 305 and the audit control unit 309, and then transmits an audit implementation instruction packet 1001a for the internal audit program on the computer 102 as an object of the internal audit, e.g., the computer 102a through the data repeating control unit 303 and the external interface control unit 304.

As shown in FIG. 12B, the data relating to the unit from which the audit implementation instruction packet 1001 is transmitted and the destination are set in a header portion 800b of the audit implementation instruction packet 1001 which is used during the internal audit. In addition, "audit", "instruction" and "audit program instruction list", which is a list of the internal audit programs, which are previously distributed to the computers and which are intended to be activated on the computers, are set in first, second and third fields 801b, 802b and 802c, respectively.

In addition, as shown in FIG. 12C, the data relating to the unit from which the audit result packet 1002 is transmitted and the destination are set in a header portion 800c of the audit result packet 1002. Further, "audit", "result" and "audit result" which is a result list of the internal audit program which has been executed on the computer are set in first, second and third fields 801c, 802c and 803c, respectively.

The internal audit is carried out in order to audit whether or not the setting information or setting state with respect to all the programs such as the application program of the computer as an object of the audit, all the control information such as the data repeating control information and all the data is proper.

For this reason, the internal audit program supplied from the management unit 103 has the proper setting information or setting state with respect to one or ones as an object of the audit out of the program, the control information and the data of the computer as an object of the audit when the computer as an object of the audit has no vulnerability. The audit control unit 309 of the router 101 reads out, in response to the internal audit program which has been distributed from the management unit 103, one or ones as an object of the audit out of the program, the control information and the data of the computer from the computer, and then compares the setting information thus read out with the corresponding proper setting information which the internal audit program has, thereby judging whether or not the computer has the vulnerability.

Now, when the internal audit program is stored in the router 101 from the management unit 103, "the proper setting information or setting state with respect to one or ones as an object of the audit out of the program, the control information and the data of the computer as an object of the audit in the case where the computer as an object of the audit has no vulnerability" is stored in the table 311 in the internal audit program 307.

The internal audit program is specified in the third field of the audit implementation instruction packet 1001, whereby which of the program, the control information and the data of the computer an object of the audit will be is specified.

In the computer 102a, the data transmission/reception control unit 403 receives the audit implementation instruction packet 1001a from the router 101a through the line control unit 4204, the bus 4207, and the external interface control unit 404. Then, the data transmission/reception control unit 403 judges, on the basis of the header portion 800b of the audit implementation instruction packet 1001a thus received, whether or not the received audit implementation instruction packet 1001a is the packet which has been addressed to the computer 102a of interest. In this case, since the received audit implementation instruction packet 1001a is the packet which has been addressed to the computer 102a of interest, the audit implementation instruction packet 1001a is transmitted to the audit program reception unit 408. Then, the audit program reception unit 408 activates and executes the internal audit programs as an object of the audit in the internal audit program unit 407 shown in the audit program instruction list of the field 803b of the audit implementation instruction packet 1001a. The internal audit programs thus activated carry out the audit for the computer 102a from the inside of the computer 102a, and the audit program reception unit 408 stores the resultant data, as the audit result 803c (the audit result 1, . . . , the audit result n), in the field 3 (803c) and then transmits it as the audit result packet 1002a to the data transmission/reception control unit 403 (Step 1003a). Then, the audit result packet 1002a is transmitted from the data transmission/reception control unit 403 to the router 101a through the external interface control unit 404, the bus 4207 and the line control unit 204.

In the router 101a, the data repeating control unit 303 receives the audit result packet 1002a through the line control unit 3204, the bus 3207 and the external interface control unit 304. Then, the data repeating control unit 303 judges, on the basis of the header 800c of the audit result packet 1002a thus received, whether or not the audit result packet 1002a is the packet which is addressed to the router 101a of interest. In this case, since the audit result packet 1002a is the packet which has been addressed to the router 101a of interest, the data repeating control unit 303 transmits the audit result packet 1002a to the internal audit program unit 307. The internal audit program unit 307 compares the audit results with respect to the internal audit programs as an object pf the audit shown in the field 803c of the received audit result packet 1002a with the corresponding contents of the self-contained table 311 (i.e., the contents of the audit results of the audit result packet in the case where there is no vulnerability with respect to each of the internal audit programs of the computer 102a as an object of the audit), thereby judging whether or not the computer of interest has the vulnerability (Step 1004a).

The contents of the table 311 are updated whenever the internal audit programs of the internal audit program unit 307 are updated, and are set every for computer as an object of the audit and audit contents contained in the internal audit program.

Likewise, as shown in FIG. 10, the router 101a transmits the audit implementation instruction packet 1001b to the internal audit programs as well of another computer 102b, and receives, in response thereto, the audit result packet 1002a of the internal audit programs to judge whether or not the computer 102b has the vulnerability (Steps 1003b and 1004b).

In the router, the procedure may be adopted in which the audit implementation instruction packets 1001a and 1001b are transmitted in parallel to each other and also the audit result packets 1002a and 1002b to the packets 1001a and 1001b are received in parallel to each other. In addition, the procedure may also be adopted in which after the audit implementation instruction packet 1001a is first transmitted and the audit result packet 1002a to the packet 1001a is received, audit implementation instruction packet 1001b is transmitted and the audit result packet 1002b to the packet 1001b is received.

FIG. 11 is a view showing the operation sequence of a specifice example of the internal audit. For example, it is assumed that in the computers 102a and 102b, it is the condition for maintaining the operation environments having compatibility that "the password" file in which the user information is described can be referred and updated by only a user X having the authority, and the condition is stored in the table 311. The router 101a transmits the audit implementation instruction packet, which specifies "a program for checking a user who can refer to and update the password file" in the field 803b, to the computers 102a and 102b (Steps 1401a and 1401b). The audit program reception unit 408 on the computers 102a and 102b executes "the program for checking a user who can refer to and update the password file" which is registered as the internal audit program (Steps 1403a and 1403b), and then informs the router of the setting information of the program thus executed as the audit result. Assuming that in the computer 102a, it has been reported as the audit result that users who can refer and update the password file are "users A, B and X", then the router 101 compares the audit result with the corresponding contents ", i.e., a user X" of the table 311 and then judges that the audit result mismatches the corresponding contents of the table 311. Therefore, the computer 102a does not fulfill the condition of the operation circumstance. As a result, the router 101a judges that the computer 102a has the vulnerability, i.e., the audit result has abnormality (Step 1404a).

On the other hand, assuming that in the computer 102b, it has been reported as the audit result that the user who can refer and update the password file is only "a user X", then the computer 102b fulfills the condition of the operation environment. Therefore, the router 101a judges that the computer 102b has no vulnerability, i.e., the audit result has no abnormality (Step 1404b).

The audit result is stored, within the router, in the log information storing unit held in each of the internal audit programs with {execution time, existence and non-existence of abnormality, the reception audit result unit (803c)} as a set, and also is stored, within each of the computers, in the log information storing unit held in each of the internal audit programs with {execution time, existence and non-existence of abnormality, the audit result detailed information} as a set. In the case of the router 101a, and the computers 102a and 102b, since the log collector 105 is connected to the user-site network 104, both the audit result and the audit result detailed information are stored in the log information unit 1203c of the log information data packet 1202c shown in FIG. 15c and then are transmitted on the network 104, whereby the resultant log information can be stored in the log collector 105.

In other routers, in the same manner, both the external audit and the internal audit are carried out.

Incidentally, the contents of the audits which are realized on the basis of the internal and external audit programs should be determined in correspondence to the function and the like which the individual computers and the network provide, and hence the audit having the various kinds of contents can be considered.

In such a way, after the external and internal audits for the computers have been completed, each of the routers 101 verifies the results of the internal or external audit as shown in FIG. 13A in order to execute the processing corresponding to the verification results.

That is, the audit control unit 309 of the router 101 successively executes the external audit program which the router 101 itself holds and the internal audit programs which are to be executed on the associated computers.

In the other words, the router 101 executes the external and internal audit programs while there remain the audit items with respect to the external and internal audit programs, by which the audit is to be carried out in the router 101 (Steps 701 and 702). In the case where a certain computer 101, e.g., the computer 101a, has abnormality as the result of confirming existence and non-existence of vulnerability (abnormality) in the computer which has been obtained by executing these programs (Step 703), a manager of the computers and a manager who manages the overall system are informed of the audit result (e.g., existence and non-existence of vulnerability and the contents of abnormality (Step 704).

This information is carried out in such a way that the audit control unit 309 in the corresponding router 101a produces the packet containing the message showing the contents of abnormality (audit result) with the unit from which data is transmitted as the router 101 and with the destination as the computer which the manager uses, and then transmits the packet thus produced to the computer which the manager uses through the data repeating control unit 303, and the external interface control unit 304 (Step 704). The manager looks at the packet on the screen of a display device in the computer which has received the packet of interest or outputs the packet using an output unit so as to look at the audit result. As for the audit results shown in the packet which has been sent to the computer of the manager, existence and non-existence of abnormality (vulnerability), the contents of the message 803a of the audit response packet 902, and the audit result of the audit result packet 803c may be available. In addition, the implementation date and time as well as the audit results may be contained in the packet which is transmitted to the computer of the manager.

In addition, the audit control unit 309 of the router 101a instructs the log collector 105 to start the collection of the traffic logs which are transmitted to the computer in which the audit results are judged to have abnormality (vulnerability) (Step 705).

In accordance with this instruction, the data reception control unit 1103 of the log collector 105 controls the external interface control unit 1104 and the log information storing unit 1106 so as for the packet which has been addressed to the computer 101a in which the audit result is judged to have abnormality to be accumulated in the log information storing unit 1106 from now. By accumulating the traffic logs collected in the log collector, it is possible to leave the record of the access situation to the computer having vulnerability, whereby the collected traffic logs can be used in verification of the unjust access from the outside and the like. In addition, in collection of such logs, the mental presentation of crimes effect for a person who intends to carry out an unjust access can be expected. In the present embodiment as well, since the collection of the traffic logs is carried out by the dedicated log collection, the data transfer performance of the router operating as the repeating unit for the data is not degraded at all. The object of the traffic logs collected by the log collector includes the packet itself as well flowing on the network. In this connection, for example, in the case of the data transfer of the TCP/IP, both the header portion and the data portion of the IP packet becomes the object of the traffic logs.

As described above, the manager who has been informed of abnormality (vulnerability) of the corresponding computer 102a from a certain router 101a takes measures to cope with the computer 102a in which the audit result has been judged to be abnormal. Thereafter, the manager transmits the packet including the message that the manager has taken measures to cope with the computer 102a in which the audit result was judged to be abnormal from the computer which the manager uses to the router 101a from which the information has been transmitted.

Then, the router 101a checks, after having sent the information of abnormality (vulnerability) of the computer 102a, whether or not the message has been received that the manager has taken measures to cope with the computer 102a in which the audit result has been judged to be abnormal within a fixed time period (Step 706). If not, the router 101 carries out the packet filtering (Step 707). That is, the audit control unit 309 of the router 101 sets the packet filtering for stopping the repeating of the packet to the computer 102a (having vulnerability)(abandoning the packet), and separates the computer 102a having vulnerability so as to enhance the computer security. Stopping the repeating of the packet to the computer having vulnerability is realized by changing the repeating control information of the storage unit 302 of the router 101. In the router 101, the repeating of the packet from the computer 102a having vulnerability may also be stopped.

FIG. 14 shows the filtering information which is stored in the storage unit 302 for the repeating control information of the router 101, e.g., the router 101a. Reference numeral 1501 designates a computer name field, reference numeral 1502 designates a field in which the application program running on the computer is registered, reference numeral 1503 designates a field indicating the internal and external audit results, reference numeral 1504 designates a field in which the data relating to whether or not the internal and external audits are carried out before the connection (i.e., whether or not the prior audit is carried out) is registered and reference numeral 1505 designates a field which is used to define the filtering, i.e., whether the packet to the computer is relayed or abandoned.

It is assumed that the programs A, X and Y for example are running, as the application programs, on the computer 102a, e.g., the computer 102a. In addition, it is assumed that it is judged as the result of the external audit that the application program A of the computer 102a has vulnerability (Step 1304a in FIG. 9), and it is judged as the result of the internal audit that the system of the computer 102a has vulnerability (Step 1404a in FIG. 11), and also it is judged that other application programs x and Y are normal. Then, the audit results of the records 1506, 1507, 1508 and 1509 with respect to the computer 102a become "abnormality", "no abnormality", "no abnormality" and "abnormality", respectively. The router 101a sets the field 1505 in such a way that if only the application program A has vulnerability in the computer 102a, then the data to only the application program is abandoned and also the data to the application programs X and Y is relayed. However, since the system of the computer 102a has vulnerability, the router 101a abandons all of the data to the computer 102a.

On the other hand, it is assumed that the program B is running, as the application program, on the computer 102b. It is assumed as the result of the internal and external audits for the computer 102b that each of the application programs B and the system is judged to have no vulnerability, then the router 101a sets the field 1505 so as to relay all the data to the computer 102b.

While in the present embodiment, there is shown the audit example in which each of the computers which are already connected to the network is an object of the audit, it is also possible to provide the facility that even if any computer is connected to the present network, the data communication cannot be started unless the internal and external audits are carried out for that computer before its connection and the router is informed of that its result has no abnormality and also the information is registered in the field 1504.

Now, with respect to the measures for the computer having vulnerability, there are employed: a method wherein vulnerability is excluded by someone else; a method wherein vulnerability is coped therewith on the basis of the measure procedure which is previously registered; and a method wherein the computer itself carries out the self-repair on the basis of the results of learning the measure procedure to the present time. In any case, if the measures have been completed, then the message of reporting that the measures have been taken in a manner as described above is transmitted to the router 101 by the computer.

On the other hand, when the router 101a receives the message that the suitable measures were taken within a fixed time period after the manager has been informed of abnormality (Step 706), the router 101a transmits the packet instructing the log collector 105 to stop acquisition of the traffic log to the log collector 105. The data transmission/reception control unit 1103 of the log collector 105 controls the external interface control unit 1104 and the log information storing unit 1106 in accordance with that instruction so as to stop accumulation of the packets which are addressed to the computer of interest in which the audit result is judged to have abnormality (Step 708).

As described above, the log collector 105 has no network address given thereto. Then, the instruction of start and stop of the log collection from the router 101 is carried out by sending the packet containing therein the instruction of start and stop of the log collection to a transmission line to which the log collector 105 is connected. Then, the data transmission/reception control unit 1103 of the log collector 105 identifies such a packet containing therein the instruction on the transmission line so as to fetch in such a packet irrespective of the network address.

FIGS. 15A, 15B and 15C show formats of the packets which are respectively used in an instruction of starting the log collection, an instruction of stopping the log collection and transmission of the log information.

As described above, the data relating to a kind of packet is set in the first field 1201 of the packet, the data relating to the operation method is set in the second field 1202, and the data to be transferred is set in the third field 1203.

As shown in FIG. 15A, "log" is set in the first field 1201a indicating a kind of packet of instructing, from the router, the log collector to start the log collection, "start" is set in the second field 1202a indicating the operation method, and "list of IDs of the computers which are specified as an object of the log collection" is set in the third field 1203a as the data to be transferred. In addition, as shown in FIG. 15B, in the traffic log collection stop packet for 20 instructing, from the router, the log collector to stop the log collection, "log", "stop" and "list of computers subjected to stop log collection" as the list of IDs of the computers which are to be excluded from an object of the log collection are respectively set in the first, second and third fields 1201b, 1202b and 1203b.

In addition, as shown in FIG. 15C, the log information packet is a packet which is used when storing or transmitting the log information, which has been acquired by the router and the computers, in or to the log collection. In this connection, "log" is set in the first field 1201c indicating a kind of packet, "data" is set in the second field 1202c indicating the operation method, and "the log information which has been acquired by the router and the computers" that is to be stored or transmitted in or to the log collector is set in the third field 1203c.

These packets are not clearly sent from the router to the log collector, but the instruction of the operation is transmitted by causing these packets to flow on the network to which the log collector is connected.

The log collector 105 monitors the packet on the transmission line to which it is connected, and with respect to the packet in which the log is set in the first field, fetches in its log information so as to store it.

The description will hereinbelow be given with respect to the reason that though no network address is given in the log collector 105 in such a way, the log information on the network can be collected.

As for a method of fetching in the packet irrespective of the network address, there is well known the data communication within a LAN (Local Area Network). In the data communication within the LAN, the log collector has the link address which becomes the connection point to the LAN, whereby all the data flowing on the LAN can be fetched in.

When the log collector has no link address as the connection point to the LAN, the log collector cannot clearly carry out the message communication based on the destination network address specification, and in addition, since the log collector cannot be provided with the communication means with any area located outside the LAN, the log collector is prevented from receiving any unjust access from the outside. Therefore, it is possible to prevent revision and destruction of the log information which is stored in the log collector.

That is, the log which is being transmitted on the network is contained in the log information data packet which has that log and is transmitted on the above-mentioned network. On the other hand, the data transmission/reception unit 1103 of the log collector 105 fetches in all the packets (containing the log information transmission packet, the traffic log collection start packet and the traffic log collection stop packet) which are transmitted on the network once. When the traffic log collection start packet (refer to FIG. 15A) which has been transmitted from the repeating installation onto the network is fetched in the data transmission/ reception unit 1103 of the log collector 105 once, the data transmission/reception unit recognizes, on the basis of the field 1202a, that the packet of interest has been transmitted in order to instruct the log collector to start the log collection. Thereafter, when the packet which has been fetched in is the log information packet, the logs within the log information packet of interest are collected so as to be stored in the log information storing unit 1106. Thereafter, when the data transmission/reception unit recognizes that the packet which is fetched in has been transmitted in order to instruct the log collector to stop the log collector on the basis of the field 1202b, hereafter, the data transmission/reception unit stops the log collection.

In such a way, the log collector 105 has the means for fetching the data flowing on the network in a manner as in the tapping in a telephone. Thus, the log collection 105 carries out only the reception of the packet when the identifier for identifying the data is the log, and carries out only the operation in accordance with the instruction of starting/stopping the log collection with respect to the log operation, and also carries out only the operation of receiving the log information itself so as to store the log information.

Next, in FIG. 13A, in Step 709, the router 101a checks whether or not the message that the measures was taken for the computer 102a in which the audit result is judged to have abnormality within a predetermined time period after having carried out the filtering of the packet (Step 1107) has been received from the computer which the manager is using. Then, when the router 101a has received the message, the router 101a stops the filtering of the packet to the computer 102a (Step 710), and thereafter transmits the packet for instructing the log collector 105 to stop the collection of the logs in the computer 102a to the network 104 (Step 711). In response thereto, the log collector 105 stops the log collection.

While in the embodiment of FIG. 13A, when the audit result is judged in Step 703 to have abnormality in any one of the computers 102a and 102b corresponding to a certain router 101, e.g., the computer 101a, all the processings in steps 704, 705 and 706 to 711 are executed, as described in the following modification, only a part of the processings in Steps 704 to 711 may be executed.

Figure 13B:
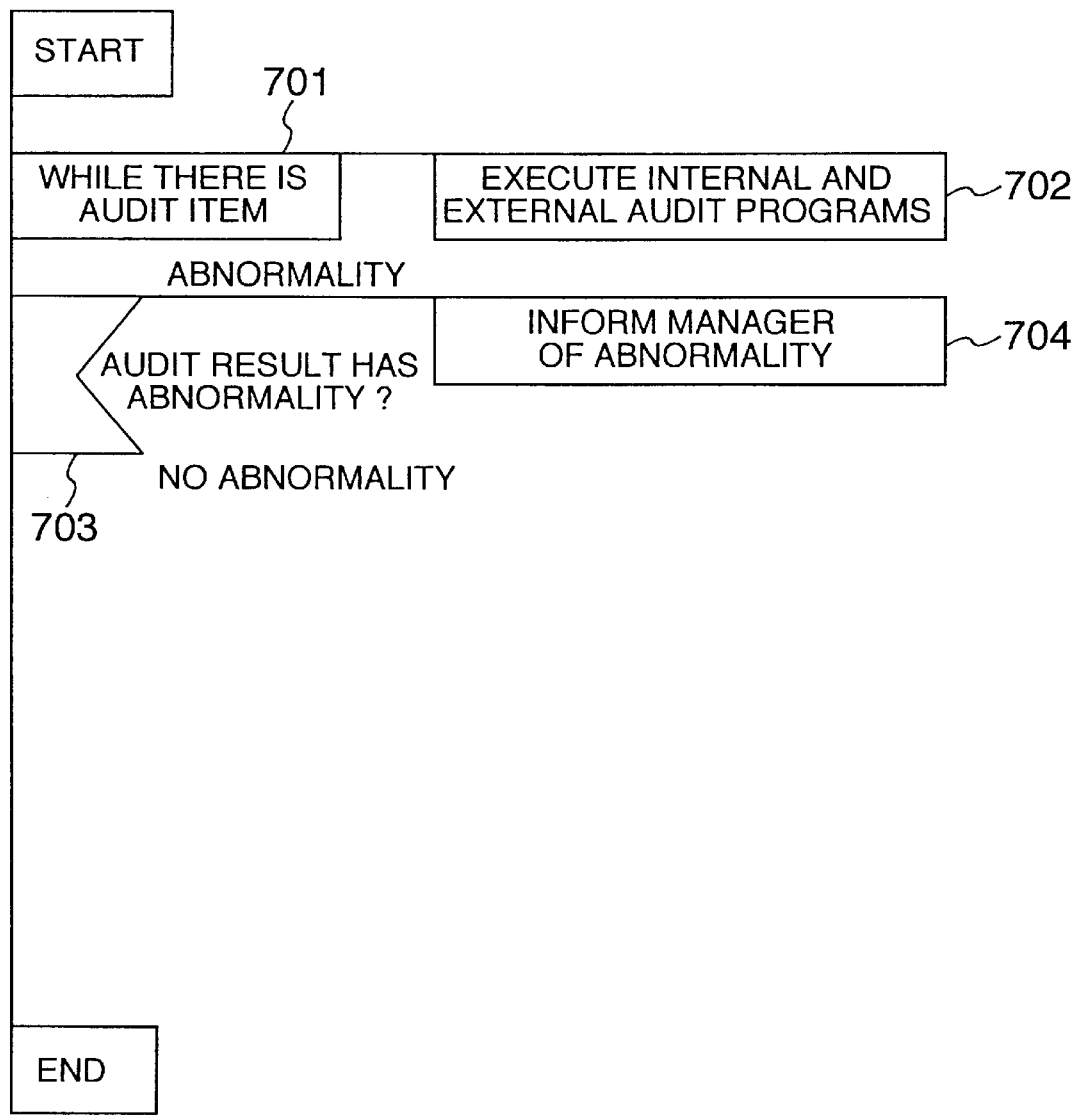
FIGS. 13B to 13E are respective views showing other examples of verification and a processing procedure of the audit result in the router of FIG. 2.

FIG. 13B is a view showing the procedure in which when the audit result is judged in Step 703 to have abnormality in a certain computer in the embodiment of FIG. 13A, only the processing in Step 704 is executed.

Figure 13C:
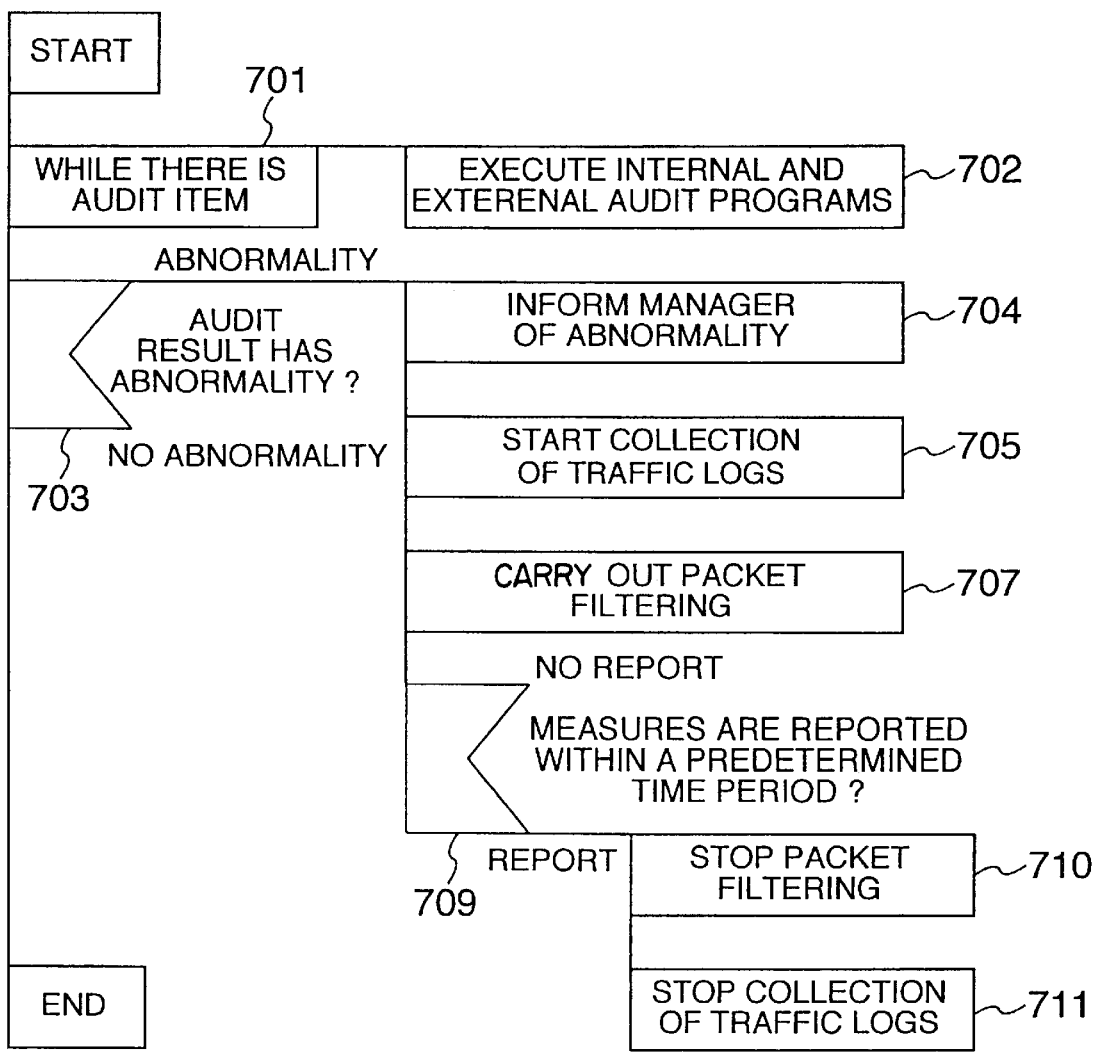

FIG. 13C is a view showing the procedure in which when the audit result is judged in Step 703 to have abnormality in a certain computer in the embodiment of FIG. 13A, only the processing in Steps 704 and 705 are executed, and then the processings in Steps 707 and 709 to 711 are executed.

Figure 13D:
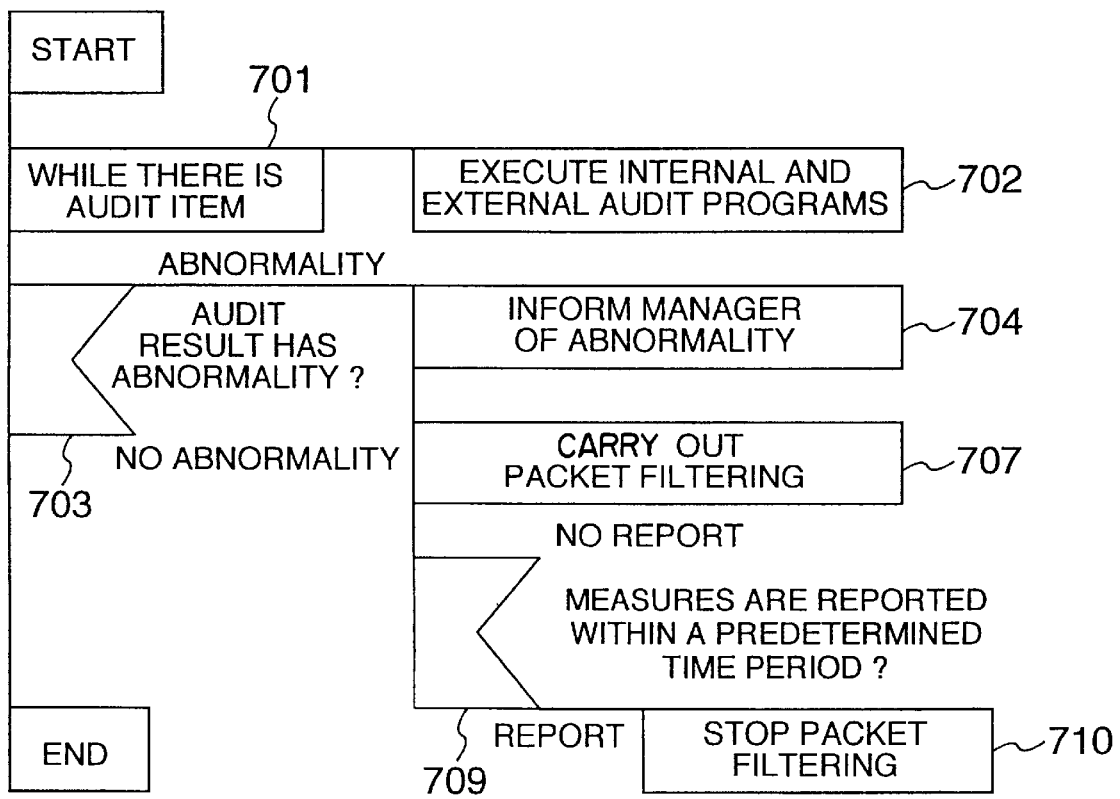

FIG. 13D is a view showing the procedure in which, when the audit result is judged in Step 703 to have abnormality in a certain computer in the embodiment of FIG. 13A, only the processing in Step 704 is executed and then the processings in Steps 707 and 709 to 710 are executed.

Figure 13E:
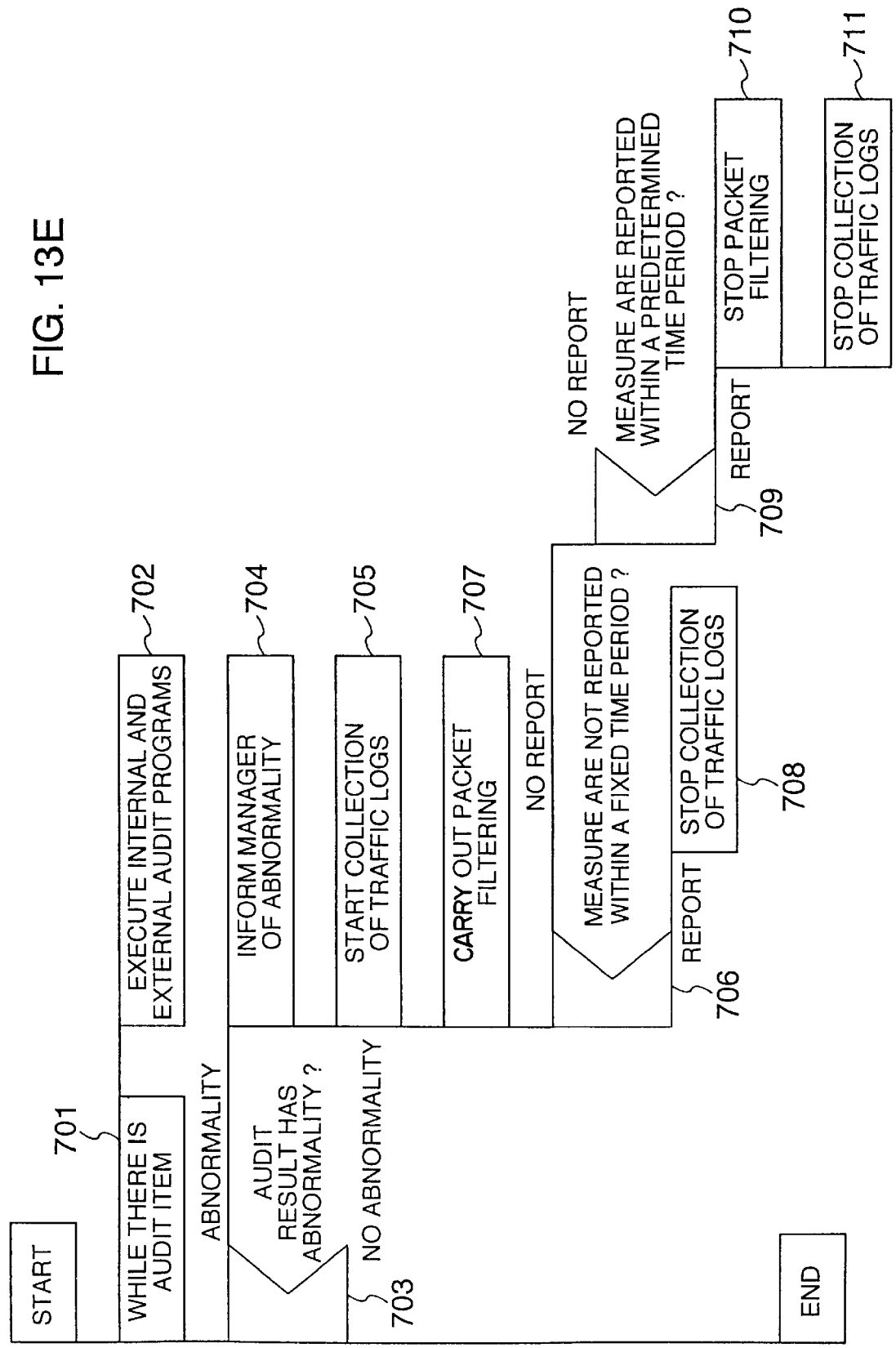

FIG. 13E is a view showing the procedure in which, when the audit result is judged in Step 703 to have abnormality in a certain computer in the embodiment of FIG. 13A, the processings in Steps 704 and 705 are executed, and then after execution of the processing in Step 707, the processings in Steps 706 and 708 to 711 are executed.

Incidentally, in the above-mentioned embodiments, the router may also set the contents of the repeating in such a way that the communication can not be started even if the computers are connected to the present network unless the internal and external audits for the computers are carried out before connection thereof to the network, and the router is informed of the fact that the audit result does not have abnormality. In addition, the external audit may be mutually carried out between the computers.

The description has been given with respect to one embodiment of the present invention.

According to the present embodiment, the following effects can be obtained.

(1) The audit program which the router or the computer executes can be updated into the newest audit program by the management unit at any time.

(2) Since the operation environments of the computers are audited on the basis of the internal and external audit programs, and when the audit result is judged to have abnormality, the computer manager and the manager who manages the overall system are informed of this fact, the manager and the like can carry out the early detection and the early measures for the computer which has vulnerability.

(3) Since, with respect to the computer having vulnerability, the collection of the traffic logs is carried out in the log collector, it is possible to carry out the verification of the unjust access from the outside on the basis of the record of the access situation.

(4) With respect to the computer which has vulnerability but has no measure taken therefor, the stop of repeating of the data which has been addressed to the computer of interest is carried out in the router, whereby the unjust invasion to the computer of interest can be excluded and also the security for the network and the computer can be improved.

(5) Since the log collector has the function by which it is impossible that the present log collector is clearly specified with the network address as the destination in order to transmit the message, it is possible to prevent revision and destruction of the log information which is stored in the log collector through the network.

Next, a second embodiment of the present 5 invention will hereinafter be described.

The second embodiment is an embodiment which is designed, as a modification of the first embodiment, in such a way that the audit of the network is distributively effected and managed, and hence has the following features.

i) A database is installed in which the audit programs are collectively registered ii) A management terminal unit function for the distributed management for the audit is added to each of the routers.

iii) When carrying out implementation of the audit, each of the routers acquires the audit program from the database in which the audit programs are collectively registered in order to carry out the audit.

In the case of the present embodiment, the router which is installed in each user site is operated as the management unit for managing the operation environments of the associated computers. The router acquires, before carrying out the audit for the associated computers, the newest audit program from the database in which the audit programs are collectively registrated, and then carries out the audit for the associated computers. By adopting such a form, the distributed application management of the network audit is realized.

Next, the description will hereinbelow be given with respect to the overall structure of the network system in the present embodiment.

The structure of the network system of the present embodiment is substantially the same as that of the first embodiment shown in FIG. 1. In the present embodiment, the unit 103 is operated as a database unit in which the audit programs which are used in the present network system are collectively registered. Reference numerals 101a to 101d respectively designate repeating installations, each of which is capable of processing the TCP/IP, the OSI protocol and the like. The repeating installations 101a to 101d are operated as management units for managing the operation environments of the user-site computers, whereby the distributed application management for the network audit is realized. For example, the router 101d can be operated as the management unit for managing the operation environments of both the computers 102d and 102f independently of other routers 101a, 101b and 101c.

Next, the description will hereinbelow be given with respect to the acquisition and distribution of the audit programs in each of the routers.

Figure 16:
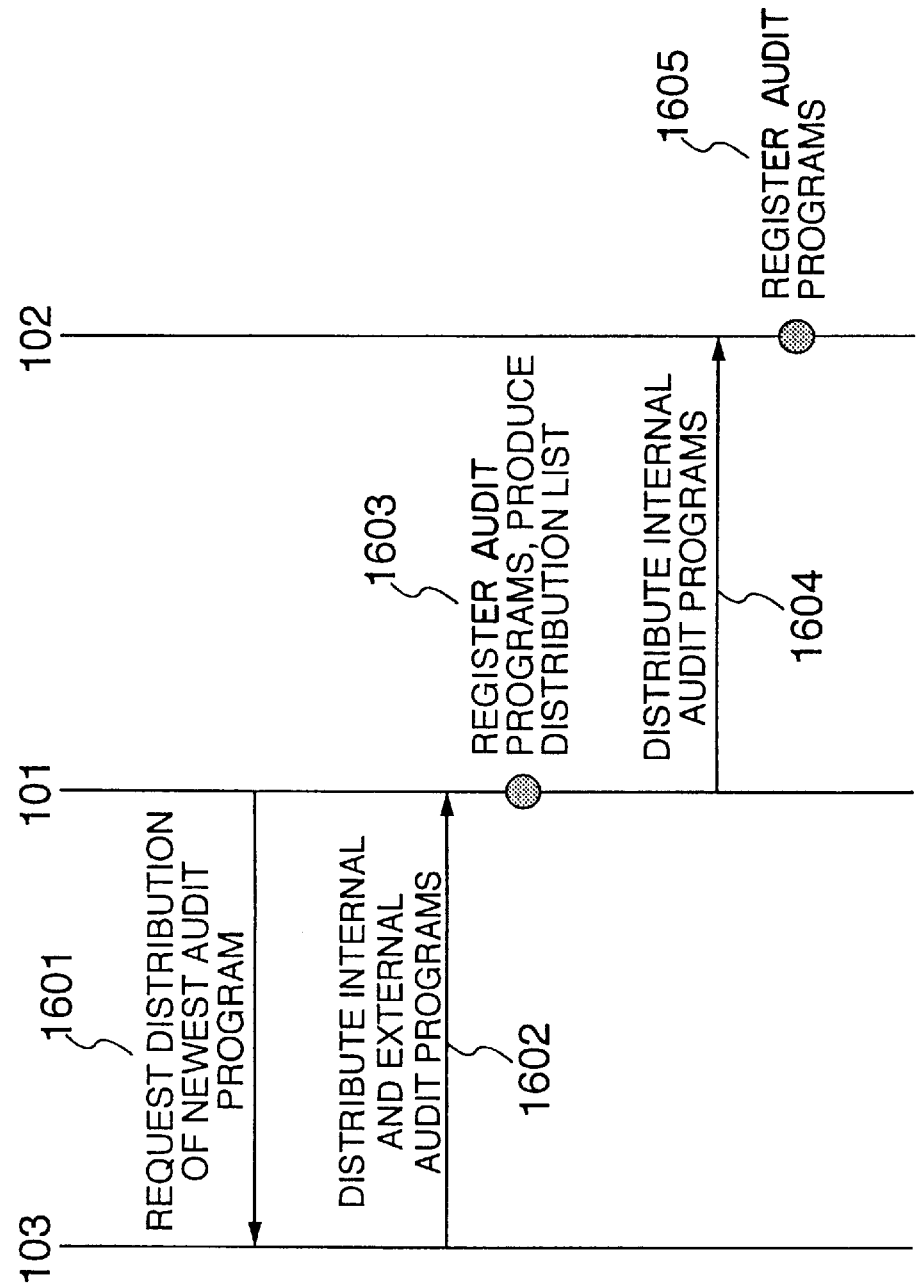
FIG. 16 is a view showing an example of a procedure of distributing internal and external audit programs in a second embodiment of the present invention.

FIG. 16 is a view showing the acquisition and distribution of the audit programs. The router 101 asks, before carrying out the audit for the computers, the database unit 103 to distribute the newest audit programs in order to carry out the acquisition operation (Steps 1601 and 1602). In the router, in order to carry out the audit, the newest audit programs thus acquired are registered as the external and internal audit programs(306 and 307) for the router (Step 1603). In addition, in the router, after producing a list of the internal audit programs which are to be distributed to the user-site computers (Step 1603), the internal audit programs are distributed to the computers (Step 1604). In each of the computers, the internal audit programs which have been received are registered (Step 1605), whereby the distribution and registration of the newest audit programs to and in the associated router and computers are completed.

The method of auditing the computers is carried out in accordance with the similar procedure to that of the first embodiment. In addition, both the information of the audit result and the measure method therefor are carried out in accordance with the similar procedure to that of the first embodiment.

According to the present embodiment, the following effects are obtained.

(1) Since the router is provided with the function of the management unit, it is possible to realize the distributed application management of the network audit.

(2) Since in implementation of the audit, the newest audit programs are acquired from the database unit in which the audit programs are registered, the mighty audit can be carried out without the audit levels 5 being different in user sites.

As set forth hereinabove, according to the present invention, it is possible to provide an audit system for computers with a large scale network as an object. In addition, when a computer has vulnerability, it is possible to prevent the unjust invasion to the computer having the vulnerability.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A network system having a network, comprising:
at least one repeating unit connected to said network;
at least one computer connected to said network through said at least one repeating unit; and
a management unit connected to said network,
wherein said management unit has distribution means for distributing an external audit program, by which said repeating unit audits vulnerability of said computer, from said management unit to said repeating unit through said network, and
said repeating unit has audit control means for executing external audit processing with respect to vulnerability of said computer in accordance with the external audit program which has been distributed from said management unit to determine whether or not said computer has the vulnerability, and separating means for logically separating said computer having been determined to have the vulnerability from said network.

2. A network system according to claim 1, wherein said separating means, when the external audit processing executed by said audit control means determines that said computer has the vulnerability, stops repeating of communication to said computer which is transmitted on said network.

3. A network system according to claim 1, wherein said repeating unit further includes means for sending, when the external audit processing executed by said audit control means determines that said computer has the vulnerability, information that said computer has the vulnerability to said management unit.

4. A network system according to claim 3, wherein said repeating unit further includes means for stopping, when said management unit does not send a report indicating that measures have been taken for the vulnerability of said computer within a predetermined time period after having sent the information to said management unit, repeating of communication to said computer which is transmitted in said network.

5. A network system according to claim 1, further comprising a log collector connected to said network,
wherein said repeating unit further includes means for issuing an instruction instructing, when the external audit processing executed by said audit control means determines that said computer has the vulnerability, said log collector to start collection of logs to said computer which are transmitted on said network, and
said log collector includes means for collecting, in response to the instruction issued from said repeating unit, the logs to said computer which are transmitted on said network.

6. A network system according to claim 5, wherein said repeating unit further includes means for instructing, when said management unit sends a report indicating that measures have been taken for the vulnerability of said computer within a predetermined time period after having sent the information to said management unit, said log collector to stop collection of logs to said computer which are transmitted on said network, and said log collector includes means for stopping the collection of the logs to said computers which are transmitted on said network, in response to the instruction that the collection should be stopped, issued from said repeating unit.

7. A network system according to claim 6, wherein the logs to said computer are stored in a log information packet which is transmitted on said network, and said log collector includes:

means for fetching all packets which are transmitted on said network, and means for collecting the logs within the log information packet in response to the instruction that the collection should be started which is issued from said repeating unit, when the packet thus fetched is in the log information packet.

8. A network system according to claim 1, wherein the external audit program which is distributed from said management unit to said repeating unit has both a message to an application program of said computer as an object of the audit and a proper response of the application program responding to the message when said computer as an object of the audit has no vulnerability, and said audit control means of said repeating unit sends, in response to the external audit program which has been distributed from said management unit, a message to the application program of said computer, and compares a response of the application to the message from said computer with the proper response of the application program, thereby determining whether or not said computer has the vulnerability.

9. A network system according to claim 1, wherein the vulnerability of said computer indicates a bug in an application program on said computer or that the setting information with respect to an application program of said computer, control information or data thereof is not proper.

10. A network system having a network, comprising:

at least one repeating unit connected to said network;

at least one computer connected to said network through said at least one repeating unit; and a management unit connected to said network, wherein said management unit includes distribution means for distributing an internal audit program, by which said computer itself audits the vulnerability of said computer, from said management unit to said computer through said network and said repeating installation, said computer includes means for executing internal audit processing with respect to the vulnerability of said computer in accordance with the internal audit program which has been distributed from said repeating unit, and informing said repeating unit of a result of the internal audit processing, and said repeating unit includes audit control means for determining, based on the result of the internal audit processing which has been informed from said computer, whether or not said computer has the vulnerability, and separating means for logically separating said computer having been determined to have the vulnerability from said network.

11. A network system according to claim 10, wherein said separating means, when the internal audit processing executed by said audit control means determines that said computer has the vulnerability, stops repeating of communication to said computer which is transmitted on said network.

12. A network system according to claim 10, wherein said repeating unit further includes means for sending, when the external audit processing executed by said audit control means determines that said computer has the vulnerability, information that said computer has the vulnerability to said management unit.

13. A network system according to claim 12, wherein said repeating unit further includes means for stopping, when said management unit has not sent a report indicating that measures have not been taken for the vulnerability of said computer within a predetermined time period after having sent the information to said management unit, repeating of communication to said computer which is transmitted in said network.

14. A network system according to claim 10, further comprising a log collector connected to said network, wherein said repeating unit further includes means for issuing an instruction instructing, when the external audit processing executed by said audit control means determines that said computer has the vulnerability, said log collector to start collection of logs to said computer which are transmitted on said network, and said log collector includes means for collecting, in response to the instruction issued from said repeating unit, the logs to said computer which are transmitted on said network.

15. A network system according to claim 14, wherein said repeating unit further includes means for instructing, when said management unit sends a report indicating that measures have been taken for the vulnerability of said computer within a predetermined time period after having sent the information to said management unit, said log collector to stop collection of logs to said computer which are transmitted on said network, and said log collector includes means for stopping the collection of the logs to said computers which are transmitted on said network, in response to the instruction that the collection should be stopped, issued from said repeating unit.

16. A network system according to claim 15, wherein the logs to said computer are contained in a log information packet which has the logs and which is transmitted on said network, and said log collector includes:

means for fetching all packets which are transmitted on said network, and means for collecting the logs within the log information packet in response to the instruction that the collection should be started issued from said repeating unit, when the packet thus fetched is in the log information packet.

17. A network system according to claim 10, wherein the internal audit program which is distributed from said management unit to said repeating installation has setting information, when said computer as an object of the audit has no vulnerability, in at least one of a program, control information and data of said computer as an object of the audit, and said audit control means of said repeating unit reads out, in response to the internal audit program which is distributed from said management unit, the setting information in at least one of the program, control information and data of said computer, from said computer and compares the setting information thus read out with the corresponding proper setting information which said internal audit program has determined whether or not said computer has the vulnerability.

18. A network system according to claim 10, wherein the vulnerability of said computer indicates a bug in an application program on said computer or that the setting information with respect to an application program of said computer, control information or data thereof is not proper.

19. A network system having a network, comprising:

a plurality of repeating units connected to said network for carrying out repeating of communication on said network;

a plurality of computers connected to said network, each of said computers being connected to said network through only a corresponding one of said plurality of repeating units; and a management unit connected to said network, wherein said management unit includes distribution means for distributing at least one of an external audit program and an internal audit program, by which said repeating installation audits vulnerability of at least one of said plurality of computers, from said management unit to said repeating units through said network, and said repeating units include audit control means for carrying out at least one of the external audit processing and the internal audit processing with respect to the vulnerability of said at least one of said plurality of computers in accordance with at least one of the external audit program and the internal audit program which have been distributed from said management unit to determine whether or not said at least one computer has the vulnerability, and separating means for logically separating said computer having been determined to have the vulnerability from said network.

20. A network system according to claim 19, wherein said separating means, when the external audit processing or the internal audit processing executed by said audit control means determines that said at least one of said plurality of computers has the vulnerability, stops repeating of communication to said computer which is transmitted on said network.

21. A network system according to claim 19, further comprising a log collector connected to said network, wherein said repeating unit further includes means for issuing an instruction instructing, when the internal audit processing or the external audit processing executed by said audit control means determines that said at least one of said plurality of coputers has the vulnerability, said log collector to start collection of logs to said at least one of said plurality of computers which are transmitted on said network, and said log collector includes means for collecting, in response to the instruction issued from said repeating instruction, the logs to said at least one computer which are transmitted on said network.

22. A network system according to claim 19, wherein the vulnerability of said computer indicates a bug in an application program on said computer or that the setting information with respect to an application program of said computer, control information or data thereof is not proper.

* * * * *